United States Patent
Peng et al.

(10) Patent No.: US 12,417,375 B2
(45) Date of Patent: Sep. 16, 2025

(54) FORECAST METHOD AND SYSTEM OF WIND POWER PROBABILITY DENSITY

(71) Applicants: Shenzhen Technology University, Shenzhen (CN); Zhejiang University, Hangzhou (CN); Changsha University of Science & Technology, Changsha (CN)

(72) Inventors: Shurong Peng, Changsha (CN); Yunhao Yang, Changsha (CN); Jiayi Peng, Changsha (CN); Bin Li, Changsha (CN); Heng Zhang, Changsha (CN); Jieni He, Changsha (CN); Lijuan Guo, Changsha (CN); Huixia Chen, Changsha (CN)

(73) Assignees: SHENZHEN TECHNOLOGY UNIVERSITY, Shenzhen (CN); ZHEJIANG UNIVERSITY, Hangzhou (CN); CHANGSHA UNIVERSITY OF SCIENCE & TECHNOLOGY, Changsha (CN)

( * ) Notice: Subject to any disclaimer, the term of this patent is extended or adjusted under 35 U.S.C. 154(b) by 735 days.

(21) Appl. No.: 17/740,086

(22) Filed: May 9, 2022

(65) Prior Publication Data

US 2023/0237316 A1    Jul. 27, 2023

(30) Foreign Application Priority Data

Jan. 21, 2022   (CN) .......................... 202210070604.8
Feb. 8, 2022    (CN) .......................... 202210117863.1

(51) Int. Cl.
*G06N 3/047*    (2023.01)
*G06N 3/044*    (2023.01)
(Continued)

(52) U.S. Cl.
CPC ............. *G06N 3/047* (2023.01); *G06N 3/084* (2013.01); *G06N 3/044* (2023.01); *G06N 3/045* (2023.01); *G06N 3/08* (2013.01)

(58) Field of Classification Search
CPC ........ G06N 3/047; G06N 3/084; G06N 3/044; G06N 3/045; G06N 3/08; Y04S 10/50
See application file for complete search history.

(56) References Cited

U.S. PATENT DOCUMENTS

| | | | |
|---|---|---|---|
| 2,626,706 A | 1/1953 | Bishop | |
| 2022/0100997 A1* | 3/2022 | Zhang | ..................... G06N 3/08 |
| 2023/0072708 A1* | 3/2023 | Wang | .................. G06N 3/0464 |

FOREIGN PATENT DOCUMENTS

| | | |
|---|---|---|
| WO | 2010054829 A1 | 5/2010 |
| WO | 2021108977 A1 | 6/2021 |

OTHER PUBLICATIONS

Alma Y. Alanis et al., ( NPL "Time Series Forecasting for Wind Energy Systems Based on High Order Neural Networks" Published Jan. 2021 (18 pages) (Year: 2021).*

(Continued)

*Primary Examiner* — Quoc A Tran

(57) ABSTRACT

A forecast method and system of wind power probability density. The forecast method includes: acquiring wind power data, preprocessing the wind power data, establishing a data set; then, constructing a time-variant deep feedforward neural network forecast model, where the model includes multiple layers of neural networks, and each layer of neural network includes an input layer, a hidden layer and an output layer which are connected in sequence; taking wind power data at adjacent moments as an input of two input layers of two adjacent layers of neural networks, taking probability density distribution of wind power at adjacent moments as an output of two output layers of two adjacent layers of neural networks, and training and testing (Continued)

the model; inputting the wind power data to be forecasted into the trained time-variant deep feed-forward neural network forecast model for forecasting to obtain a more accurate and reliable wind power forecast result.

7 Claims, 18 Drawing Sheets

(51) Int. Cl.
*G06N 3/045* (2023.01)
*G06N 3/08* (2023.01)
*G06N 3/084* (2023.01)

(56) References Cited

OTHER PUBLICATIONS

Hu, et al.; "Effects of high-pressure processing and thermal pasteurization on quality and microbiological safety of jabuticaba (*Myrciaria cauliflora*) juice during cold storage"; J Food Sci Technol, Sep. 2020; Association of Food Scientists & Technologists; 11 pgs.

Guo, et al.; "Extraction of pectin from navel orange peel assisted by ultra-high pressure, microwave or traditional hearing: A comparison"; Carbohydrate Polymers 88 (2012) 441-448; http://www.elsevier.com/locate/carbol; 8 pgs.

Mohamed; "Extraction and characterization of pectin from grapefruit peels"; MOJ Food Process Technol. 2016;2(1):31-38; Feb. 19, 2016; 8 pgs.

Chen, et al.; "Ultrasound-assisted modified pectin from unripe fruit pomace of raspberry (*Rubus chingii hu*): Structural characterization and antioxidant activities"; LWT—Food Science and Technology 134 (2020) 110007; Aug. 3, 2020; 9 pgs.

\* cited by examiner

FORECAST METHOD AND SYSTEM OF WIND POWER PROBABILITY DENSITY

CROSS REFERENCE TO RELATED APPLICATION

This patent application claims the benefit and priority of Chinese Patent Application No. 202210070604.8, filed on Jan. 21, 2022, and Chinese Patent Application No. 202210117863.1 filed on Feb. 8, 2022, the disclosure of which is incorporated by reference herein in its entirety as part of the present applications.

TECHNICAL FIELD

The present disclosure relates to the field of wind power forecasting, and particularly relates to a forecast method and system of wind power probability density based on a time-variant deep feed-forward neural network.

BACKGROUND ART

A wind power forecast technology refers to the forecast of the magnitude of power output by wind power plants in a period of time in the future, so as to arrange dispatching plans. This is because wind energy is an unstable energy source with random fluctuations, and incorporation of large-scale wind power into a system will inevitably bring new challenges to the stability of a power system. Therefore, accurate forecast of wind power is of great significance to formulation of power dispatching strategies and stable operation of the power system.

Existing wind power forecast methods include certainty forecast (point forecast) and uncertainty forecast (interval forecast). The point forecast method can obtain a certain wind power forecast value which mainly involves support vector machines, time series, neural networks, etc., but cannot quantitatively describe the uncertainty of wind power. Because wind power generation relies heavily on natural factors and is easily affected by weather factors, it has uncertainty. Therefore, a traditional point forecast method cannot avoid forecast errors. The uncertainty forecast is the forecast of a fluctuation range or probability density of wind power in the future, which can reflect the fluctuation range and probability of wind power at a specific time, and the forecast result is generally presented in the form of a wind power probability density function. Compared with the point forecast method, the uncertainty forecast can quantify the uncertainty of wind power and can more accurately forecast wind power, thereby bringing more comprehensive decision-making basis for power system dispatchers. At present, the uncertainty forecast mostly adopts a forecast method based on a recurrent neural network (RNN) model or a convolutional neural network (CNN) model. The RNN or CNN model and its variants all have a time-invariant property, that is, model parameters remain unchanged over time, and the same weight parameters are continuously used. Based on the uncertainty of wind power, the time-invariant property of these models will reduce the forecast ability to wind power, the forecast accuracy is lower, and the uncertainty of wind power cannot be accurately forecasted.

SUMMARY

An objective of the present disclosure is to provide a forecast method and system of wind power probability density, so as to improve the forecast accuracy of wind power, and solves the problems that an existing forecast method has low forecast accuracy and cannot accurately forecast the uncertainty of wind power.

In order to achieve the above objective, the present disclosure provides the following technical solutions:

On the one hand, the present disclosure provides a forecast method of wind power probability density, including:
  acquiring wind power data, preprocessing the wind power data, and establishing a data set;
  constructing a time-variant deep feed-forward neural network forecast model, where the time-variant deep feed-forward neural network forecast model includes multiple layers of neural networks, and each layer of neural network includes an input layer, a hidden layer and an output layer which are connected in sequence;
  dividing the data set into a training set and a test set; taking wind power data at adjacent moments as an input of two input layers of two adjacent layers of neural networks, taking probability density distribution of wind power at adjacent moments as an output of two output layers of two adjacent layers of neural networks, and training and testing the time-variant deep feed-forward neural network forecast model to obtain a trained time-variant deep feed-forward neural network forecast model; and
  inputting the wind power data to be forecasted into the trained time-variant deep feed-forward neural network forecast model for forecasting to obtain a wind power forecast result, where the wind power forecast result is used as reference data for power dispatching.

On the other hand, the present disclosure further provides a forecast system of wind power probability density, including:
  a wind power data acquiring and preprocessing module, used to acquire wind power data, preprocess the wind power data, and establish a data set;
  a forecast model constructing module, used to construct a time-variant deep feed-forward neural network forecast model, where the time-variant deep feed-forward neural network forecast model includes multiple layers of neural networks, and each layer of neural network includes an input layer, a hidden layer and an output layer which are connected in sequence;
  a forecast model training and testing module, used to divide the data set into a training set and a test set, where two input layers of two adjacent layers of neural networks take wind power data at adjacent moments as an input, two output layers of two adjacent layers of neural networks take probability density distribution of wind power at adjacent moments as an output, and the time-variant deep feed-forward neural network forecast model is trained and tested to obtain a trained time-variant deep feed-forward neural network forecast model; and
  a forecast model application module, used to input the wind power data to be forecasted into the trained time-variant deep feed-forward neural network forecast model for forecasting to obtain a wind power forecast result, where the wind power forecast result is used as reference data for power dispatching.

According to the specific embodiments provided by the present disclosure, the present disclosure discloses the following technical effects:

The present disclosure provides a forecast method and system of wind power probability density. A time-variant deep feed-forward neural network forecast model is constructed, the model includes multiple layers of neural networks, each layer of neural network includes an input layer, a hidden layer and an output layer which are connected in sequence, two input layers of two adjacent layers of neural networks take wind power data at adjacent moments as an input, and two output layers of two adjacent layers of neural networks take probability density distribution of wind power at adjacent moments as an output. By taking the data corresponding to continuous adjacent moments as the input and the output, the model has a multi-step forecast ability. Each time of forecast is based on the forecast result of the previous time and the collected historical wind power data, the time-varying property and multi-step forecast ability of the time-variant deep feed-forward neural network forecast model are fully used, and the historical wind power data within a continuous period of time is input into the model to accurately forecast the probability density distribution of wind power in a period of time in the future. The present disclosure can improve the forecast accuracy of wind power, and solve the problems that an existing time-invariant model has low forecast accuracy and cannot accurately forecast the uncertainty of wind power.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following description show merely some embodiments of the present disclosure, and persons of ordinary skill in the art may still derive other accompanying drawings from these accompanying drawings without creative efforts. The following accompanying drawings are not intentionally scaled to an actual size in an equal proportion, and the emphasis is to illustrate the gist of the present disclosure.

DETAILED DESCRIPTION OF THE EMBODIMENTS

The technical solutions of the embodiments of the present disclosure are clearly and completely described below with reference to the accompanying drawings. Apparently, the described embodiments are merely some rather than all of the embodiments of the present disclosure. All other embodiments obtained by those of ordinary skill in the art based on the embodiments of the present disclosure without making inventive efforts shall fall within the scope of protection of the present disclosure.

An objective of the present disclosure is to provide a forecast method and system of wind power probability density, so as to improve the forecast accuracy of wind power, and solve the problems that the existing forecast method has low forecast accuracy and cannot accurately forecast the uncertainty of wind power.

To make the foregoing objective, features, and advantages of the present disclosure clearer and more comprehensible, the present disclosure will be further described in detail below with reference to the accompanying drawings and specific embodiments.

Embodiment 1

Figure 1:
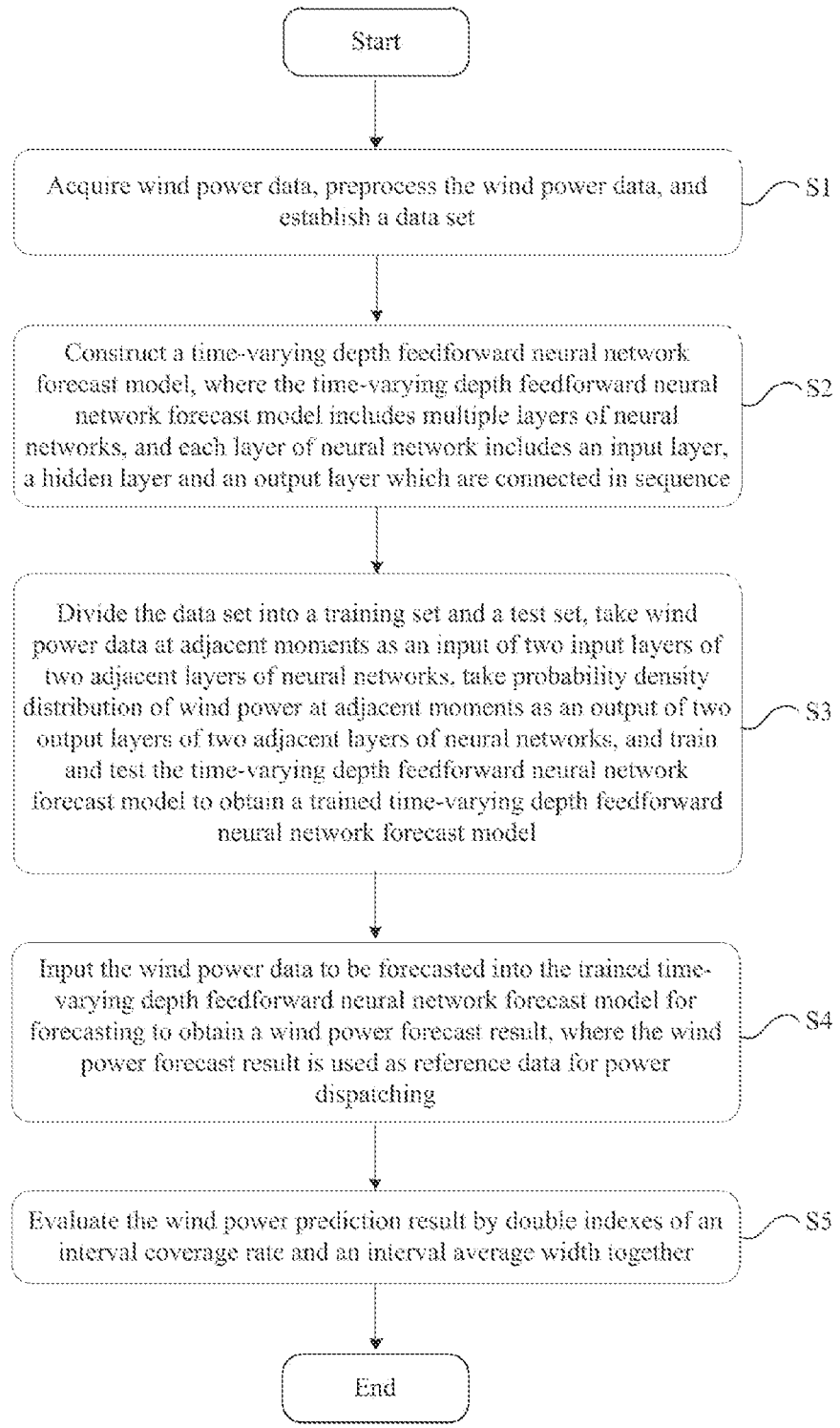
FIG. 1 is a flow diagram of a forecast method of wind power probability density provided in an embodiment 1 of the present disclosure.
Figure 2:
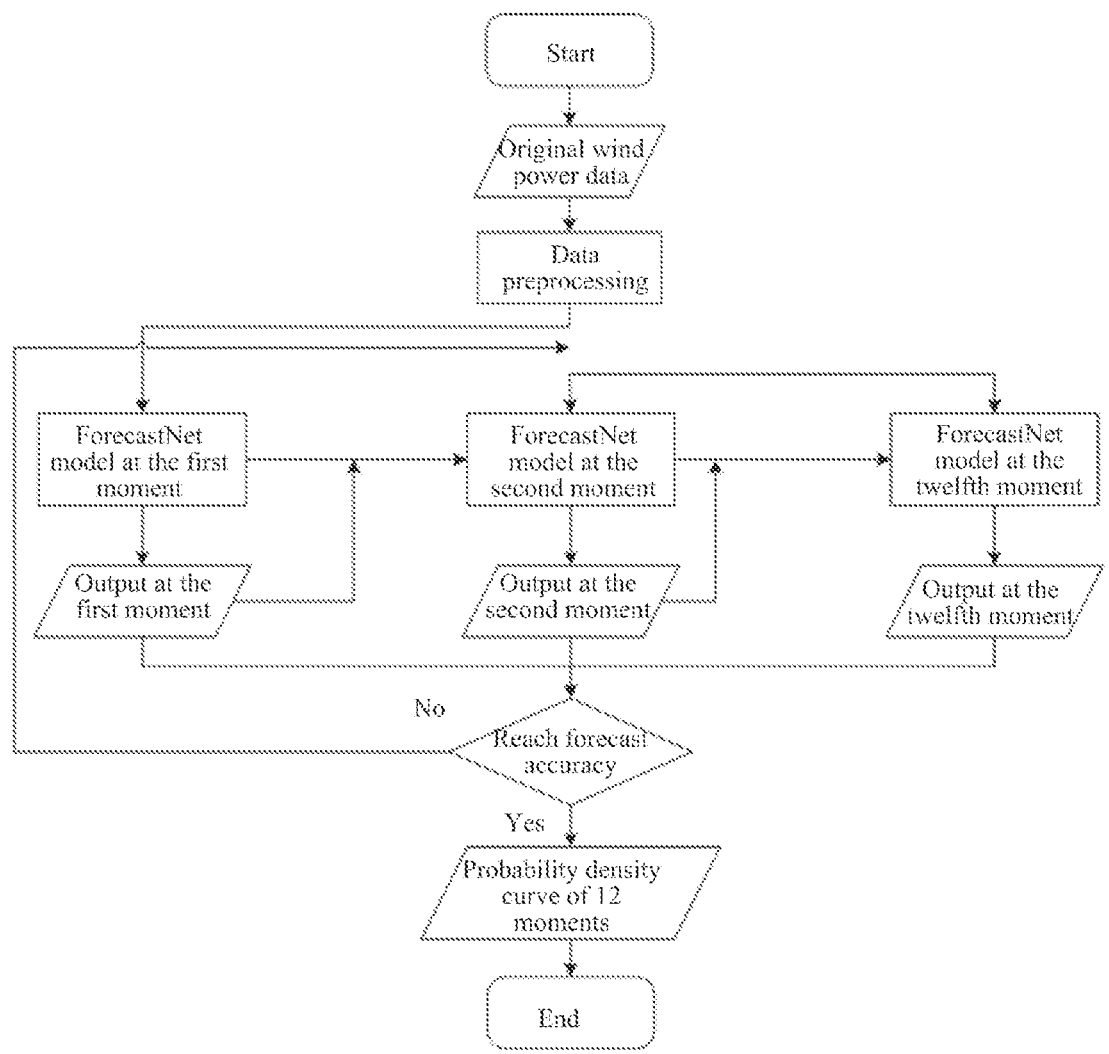
FIG. 2 is a schematic diagram of the forecast method of wind power probability density provided in Embodiment 1 of the present disclosure.

As shown in FIG. 1 and FIG. 2, this embodiment provides a forecast method of wind power probability density. The method includes the following steps:

S1: wind power data is acquired, the wind power data is preprocessed, and a data set is established. S1 specifically includes:

S1.1: original wind power data is acquired.

In this embodiment, the original wind power data is acquired historical wind power data within a preset period of time, and historical wind power data in various time units can be acquired according to actual needs.

S1.2: missing data in the original wind power data is supplemented. A processing method can adopt a Lagrangian interpolation method, a moving average method, a regression method or an interpolation method. In this embodiment, the Lagrangian interpolation method is preferred. By processing the missing data which has a greater influence on the forecast accuracy, and using the Lagrangian interpolation method to supplement the missing data, the continuity of the data can be improved, thereby improving the forecast accuracy of the model.

S1.3: The wind power data after supplementing is normalized by a maximum and minimum normalization method, and each piece of the wind power data is converted into wind power data between [0, 1]. A normalization formula is:

$$x' = \frac{x - \min(x)}{\max(x) - \min(x)}, \tag{1}$$

where x represents an actual value of wind power, x' represents a normalized wind power value, min(x) represents a minimum value of wind power, and max(x) represents a maximum value of wind power.

S1.4: The data set is established by the converted wind power data.

S2: A time-variant deep feed-forward neural network forecast model (ForecastNet model) is constructed.

Figure 3:
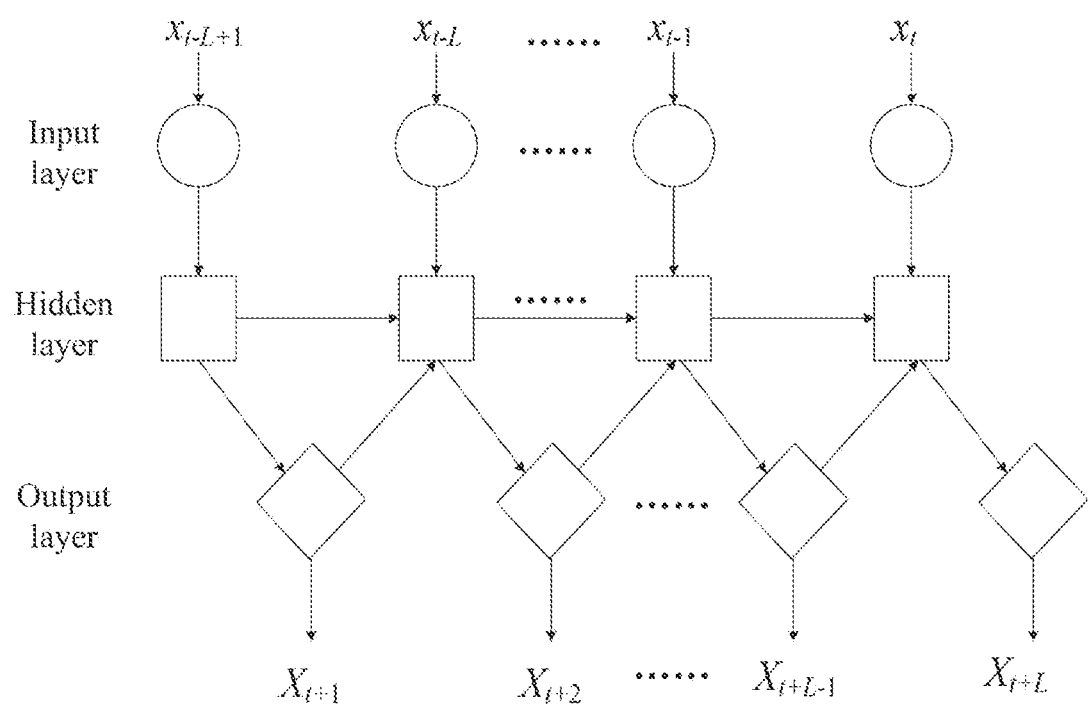
FIG. 3 is a network structure diagram of a time-variant deep feed-forward neural network forecast model provided in Embodiment 1 of the present disclosure.

As shown in FIG. 3, the time-variant deep feed-forward neural network forecast model constructed in the present disclosure includes L layers of neural networks, each layer of neural network includes an input layer, a hidden layer and an output layer which are connected in sequence, and the hidden layer and the output layer of each layer of neural network are connected to the hidden layer of the next layer of neural network at the same time. Two input layers of two adjacent layers of neural networks take wind power data at adjacent moments acquired in S1 as an input, and two output layers of two adjacent layers of neural networks take probability density distribution of wind power at adjacent moments as an output, where the probability density distribution of wind power is a wind power forecast result. Furthermore, as shown in FIG. 3, in addition to the first layer of neural network, the input of the hidden layers of the second layer of neural network and each subsequent layer of neural network is the probability density distribution of wind power at the previous moment output by the output layer of the previous layer of neural network and the wind power data input by the input layer of the current layer of neural network, and the input of the last layer of neural network and the output of the first layer of neural network are two adjacent moments in time.

In this embodiment, the input layer of the time-variant deep feed-forward neural network forecast model is a set of lagged values of a dependent variable, and the dependent variable may be univariate or multivariate. The hidden layer represents some form of feedforward neural network, such as a fully connected neural network, a convolutional neural network (CNN), or an attention mechanism. In this embodiment, the hidden layer can adopt a fully connected network (FCN), a CNN or a CNN with an attention mechanism (CANN), that is, an FCN hidden layer, a CNN hidden layer or a CANN hidden layer. In a model training process, the inside of each hidden layer adopts an alternate output manner to provide local information to a hidden layer inside a neural network, thereby significantly reducing the depth of the network. In the training process, as the depth of the network decreases, the convergence of the model can be effectively improved.

S2 specifically includes:

S2.1: a time-variant deep feed-forward neural network forecast model with L layers of neural networks is constructed, and each layer of neural network includes an input layer, a hidden layer and an output layer. Given two adjacent inputs $x_t$ and $x'_t$, two hidden layer units $h_t$ and $h'_t$, two outputs $y_t$ and $y'_t$ respectively corresponding to inputs $x_t$ and $x'_t$, and a time variation $t_0$, $x'_t=x_{t-t_0}$ and $h'_t=h_{t-t_0}$, a time-invariant property requirement $y'_t=y_{t-t_0}$, and according to Formula $y_t=f_t(g_t(x_t, h_{t-1}, y_{t-1}))$, outputs when time changes are respectively expressed as:

$$y_{t-t_0}=f_{t-t_0}(g_{t-t_0}(x_{t-t_0},h_{t-t_0},y_{t-t_0-1})) \tag{2}$$

$$y'_t=f_t(g_t(x'_t,h'_{t-1},y'_{t-1}))=f_t(g_t(x_{t-t_0},h_{t-t_0-1},y_{t-t_0-1})) \tag{3}$$

where $x_t$ and $x'_t$ represent input wind power data at two adjacent moments, $h_t$ and $h'_t$ represent two hidden layer units, $y_t$ and $y'_t$ represent two outputs respectively corresponding to $x_t$ and $x'_t$, $t_0$ represents a time variation, $x'_t=x_{t-t_0}$, and $h'_t=h_{t-t_0}$.

According to Formulas (2) and (3), $y'_t \neq y_{t-t_0}$ is obtained, which means that the time-variant deep feed-forward neural network forecast model adopted in the present disclosure has a time-varying property.

S2.2: Each output in the time-variant deep feed-forward neural network forecast model provides a forecast of wind power for a period of time in the future, therefore, the deeper the model network is, the more information is output, and the model network will become more complex as the forecast range expands. As a result, in this embodiment, an output layer adopts a theory of a mixed density network, and a probability distribution model is established on each output layer. The probability distribution model adopts a normal distribution model, and an average value $\mu^{[l]}$ and a standard deviation $\sigma^{[l]}$ of normal distribution output by a hidden layer unit of an lth layer of neural network are respectively expressed as:

$$\mu^{[l]}=W_\mu^{[l]T}a^{[l-1]}+b_\mu^{[l]} \tag{4}$$

$$\sigma^{[l]}=\log(1+\exp(W_\sigma^{[l]T}a^{[l-1]}+b_\sigma^{[l]})) \tag{5}$$

where $a^{[l-1]}$ represents an output of a previous hidden layer unit, $W_\mu^{[l]T}$ and $b_\mu^{[l]}$ respectively represent a weight and a bias of the average value, and $W_\sigma^{[l]T}$ and $b_\sigma^{[l]}$ respectively represent a weight and a bias of the standard deviation.

S2.3: In a forecast process, the normal distribution N ($\mu^{[l]},\sigma^{[l]}$) is sampled to obtain a forecast result of the lth layer of neural network, and the forecast result obtained after sampling is fed back to the next layer of network; a maximum likelihood estimation is taken as a loss function, and back propagation is performed to obtain a weight and a bias of the network; and the network is trained by an Adam gradient descent method to optimize a log likelihood function of normal distribution.

A loss function C of the time-variant deep feed-forward neural network forecast model is expressed as:

$$C = \log \prod_{i=1}^{l} p(x_i; N(\mu, \sigma)), \tag{6}$$

where $x_i$ represents a wind power data sample, $p(x_i;N(\mu, \sigma))$ represents distribution density of the wind power data sample, and $$\prod_{i=1}^{l} p(x_i; N(\mu, \sigma))$$

represents a likelihood function of the wind power data sample.

Figure 4:
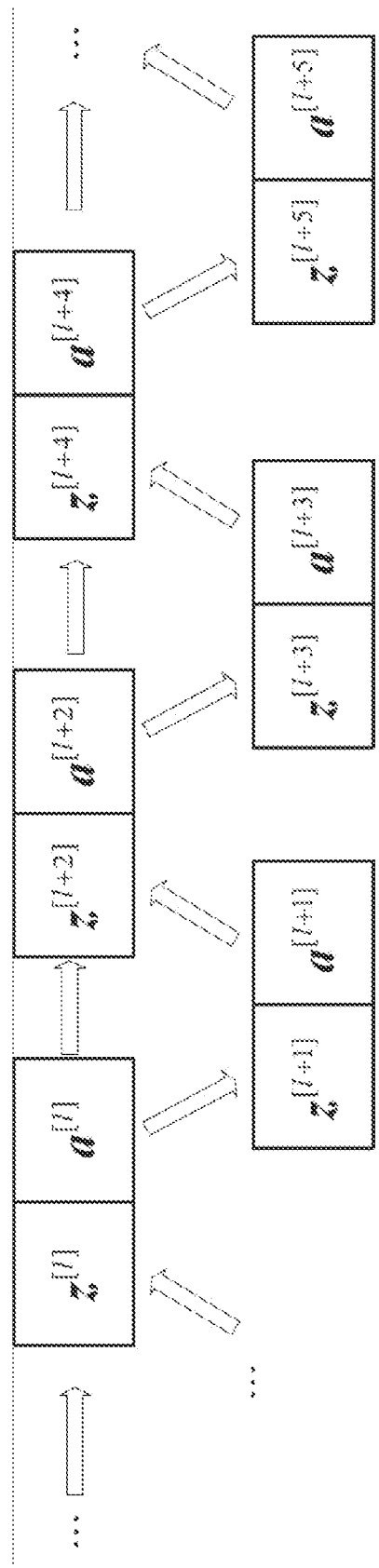
FIG. 4 is a schematic diagram of an alternate output manner of a hidden layer provided in Embodiment 1 of the present disclosure.

For a time-variant deep feed-forward neural network forecast model with L layers of neural networks, each hidden layer includes a hidden neuron and a linear output neuron, as shown in FIG. 4, specifically including:

for the lth layer of neural network, a chain method is used to calculate a partial derivative of the loss function with respect to a weight matrix of the lth layer of neural network, expressed as:

$$\frac{\partial C}{\partial W^{[l]}} = \frac{\partial C}{\partial a^{[l]}} \frac{\partial a^{[l]}}{\partial W^{[l]}}, \quad (7)$$

where l represents the lth layer of neural network of the time-variant deep feed-forward neural network forecast model with L layers of neural networks, $W^{[l]}$ represents the weight matrix, C represents the loss function, $a^{[l]}$ represents an output vector, an input vector is $z^{[l]} = W^{[l]T} a^{[l-1]} + \overline{b}^{[l]}$, and $\overline{b}^{[l]}$ represents a bias parameter matrix;

a calculation process of the alternate output of hidden layers is expressed as:

$$\frac{\partial C}{\partial W^{[l]}} = \sum_{k=0}^{\frac{L-1-l}{2}} \frac{\partial C}{\partial z^{[l+2k+1]}} \frac{\partial z^{[l+2k+1]}}{\partial a^{[l+2k]}} \Psi_k \frac{\partial a^{[l]}}{\partial W^{[l]}}, \quad (8)$$

where L represents a number of layers of neural networks of the time-variant deep feed-forward neural network forecast model, k represents a number of consecutive multipliers, and $\Psi_k$ represents a product of chain method derivatives, expressed as:

$$\Psi_k = \begin{cases} 1 & k = 0 \\ \prod_{j=1}^{k} \frac{\partial z^{[l+2j]}}{\partial a^{[l+2(j-1)]}} & k > 0 \end{cases}, \quad (9)$$

where j represents a single element of a cumulative term; and in the calculation process of the alternate output of the present disclosure, the gradient calculation of each hidden layer is not a product of relevant weights between the last layer of network and the current layer of network in a traditional chain method, but is a sum of all items after the multiplication chain in the chain method is decomposed into multiple items, and the calculation process continues until the last output layer. As a result, the sum of these terms is more stable than the product of the relevant weights, so that local information can be provided to the hidden layers inside the network to significantly reduce the depth of the network.

S3: The data set is divided into a training set and a test set, and the time-variant deep feed-forward neural network forecast model is trained and tested to obtain a trained time-variant deep feed-forward neural network forecast model. S3 specifically includes:

S3.1: the data set is divided into a training set and a test set, where the training set is used for model training, and the test set is used for model testing. In this embodiment, a sample ratio of the training set to the test set is 8:2. It is easy to understand that the number of samples in the training set and the test set is not fixed and unique, and may also be in other ratios, which can be set according to actual situations.

S3.2: The time-variant deep feed-forward neural network forecast model is trained and tested. During training and testing, two input layers of two adjacent layers of neural networks take wind power data at adjacent moments as an input, and two output layers of two adjacent layers of neural networks take probability density distribution of wind power at adjacent moments as an output.

As shown in FIG. 3, in the present disclosure, in a training process of the time-variant deep feed-forward neural network forecast model, $x_{t-L+1}, x_{t-L}, \ldots, x_{t-1}$ and $x_t$ are input, and corresponding outputs are $X_{t+1}, X_{t+2}, \ldots, X_{t+L-1}$ and $t_{t+L}$, where L represents a number of layers of neural networks of the time-variant deep feed-forward neural network forecast model, t represents a time variable, $x_{t-L+1}$, $x_{t-L}$, $x_{t-1}$ and $x_t$ respectively represent wind power data corresponding to a time t−L+1, a time t−L, a time t−1 and a time t, and $X_{t+1}$, $X_{t+2}$, $X_{t+L-1}$ and $X_{t+L}$ respectively represent probability density distribution of wind power corresponding to a time t+1, a time t+2, a time t+L−1 and a time t+L.

Figure 5:
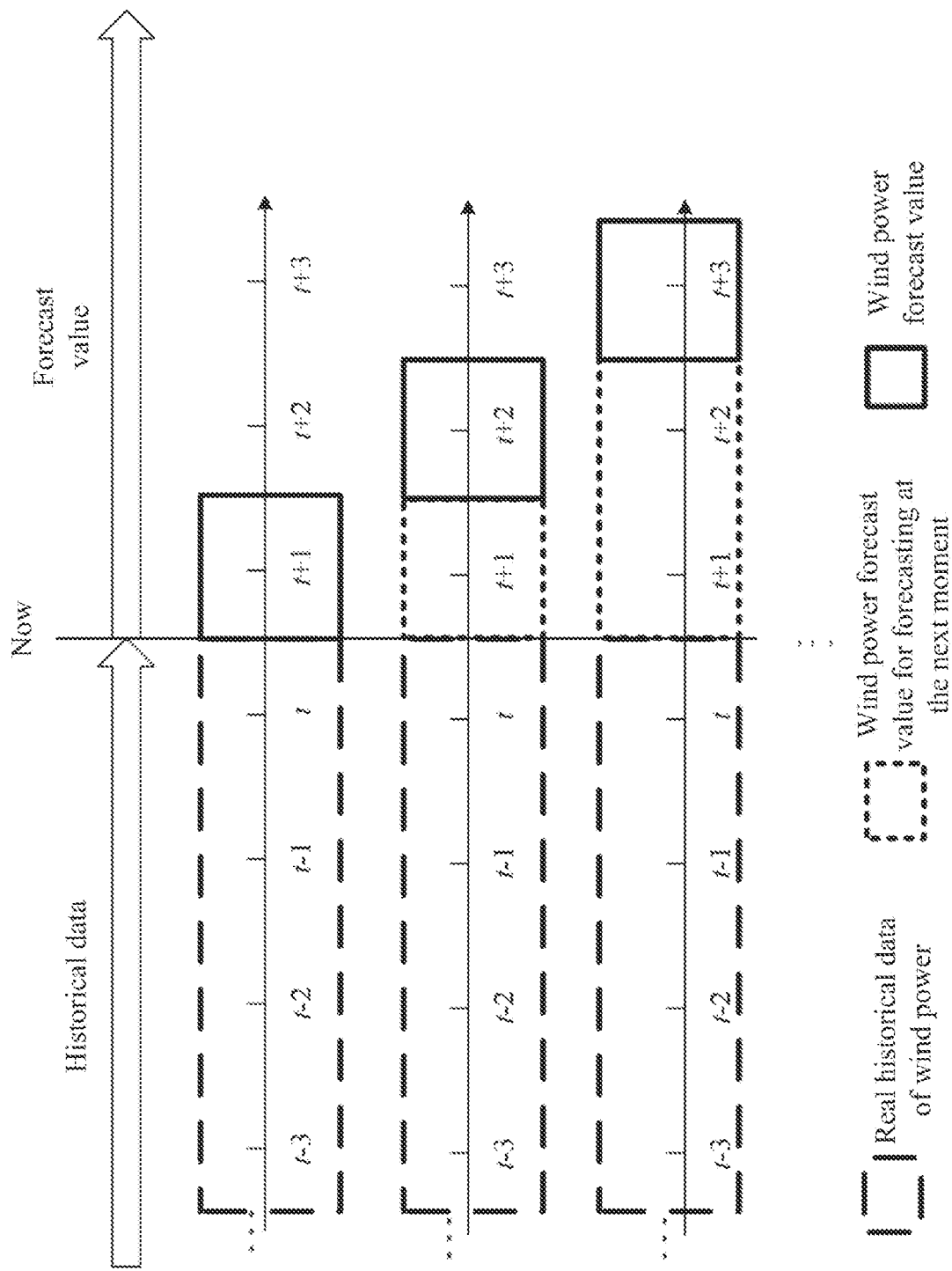
FIG. 5 is a schematic diagram of multi-step forecast provided in Embodiment 1 of the present disclosure.

In the present disclosure, when the wind power at the next moment is forecasted, the historical wind power data within the preset time before the previous moment and the forecast result data at the previous moment are together taken as training set data. As shown in FIG. 5, the model parameters of the time-variant deep feed-forward neural network forecast model are trained, the training is stopped when a maximum number of iterations is reached, and the effect of the time-variant deep feed-forward neural network forecast model is tested by the test set to obtain a trained time-variant deep feed-forward neural network forecast model.

The present disclosure combines two manners of alternate output and multi-step forecast, and each time of multi-step forecast can obtain the wind power in a preset period of time in the future. In this embodiment, the preset time is preferably 12 hours, that is, each time of multi-step forecast can obtain the wind power in the next 12 hours. As shown in FIG. 2, the preset time can be set according to actual needs. By means of multi-step forecast, the forecast result at each moment is not only related to a true value of the input wind power, but also fully considers the influence of the wind power forecast value at the previous moment on the current forecast result, so that the model can accurately track the law of data changes and can fully learn the dependence relationship between an input and an output and between outputs. Furthermore, while avoiding the cumulative error of recursive multi-step forecast in a traditional deep learning model, the model also fully considers the strong correlation of wind power values at adjacent moments.

S3.3: The effect of the trained time-variant deep feed-forward neural network forecast model is verified by the test set.

S4: The wind power data to be forecasted is input into the trained time-variant deep feed-forward neural network forecast model for forecasting to obtain a wind power forecast result, where the wind power forecast result is used as reference data for power dispatching to participate in a power dispatching work to assist power dispatchers in formulating a power dispatching scheme.

S5: After the wind power forecast result is obtained, the wind power forecast result is evaluated by double indexes of an interval coverage rate and an interval average width. S5 specifically includes:

S5.1: an uncertainty error of the wind power forecast result is evaluated by double indexes of the interval coverage rate and the interval average width together. S5.1 specifically includes:

S5.1.1: the uncertainty error of the wind power forecast result is evaluated by the interval coverage rate, expressed as:

$$\begin{cases} I_i^\alpha = [L_i^\alpha, U_i^\alpha] \\ \xi_i^\alpha = \begin{cases} 0 & P^i \notin I_i^\alpha \\ 1 & P^i \in I_i^\alpha \end{cases} \quad i = 1, 2, ggg, N \\ R_{cover} = \frac{1}{N} \sum_{i=1}^{N} \xi_i^\alpha \end{cases} \quad (10)$$

where $L_i^\alpha$ represents a lower bound of an ith forecast interval under a confidence level 1−α; $U_i^\alpha$ represents an upper bound of the ith forecast interval under the confidence level 1−α; $I_i^\alpha$ represents the ith forecast interval; N represents a number of forecast intervals; $P^i$ represents a value corresponding to an actual point; $R_{cover}$ represents a reliability index; and $\xi_i^\alpha$ represents whether the ith true value falls within the forecast interval, that is, a coverage rate of a wind power forecast interval to a true value.

In the present disclosure, the interval coverage rate represents a ratio of the forecast interval including the true value of wind power, that is, the coverage rate of the wind power forecast interval to the true value, and the larger the interval coverage rate, the higher the confidence level of the forecast interval. When the confidence level is given in advance, the interval coverage rate should not be less than the given confidence level, and the larger the interval coverage rate, the more the true value of wind power falls within the corresponding interval range, that is, the better the forecast effect.

S5.1.2: The uncertainty error of the wind power forecast result is evaluated by the interval average width, expressed as:

$$\begin{cases} \delta_i^\alpha = U_i^\alpha - L_i^\alpha \\ NWP = \frac{1}{N} \sum_{i=1}^{N} \delta_i^\alpha \end{cases} \quad (11)$$

where $\delta_i^\alpha$ represents a width of the ith forecast interval, and NWP represents an interval average width index.

When an interval given by the forecast model is too broad, the interval coverage rate is usually higher, and a too broad interval width will lead to less useful information provided by the forecast result, so that the range of the forecast interval will lose its practical significance. Therefore, a single index of the interval coverage rate cannot fully and truly reflect the advantages and disadvantages of the interval forecast result. Based on this, on the basis of the interval coverage rate index, the present disclosure also combines an interval average width index to together judge the advantages and disadvantages of the interval forecast result. The combination of double indexes of the interval coverage rate and the interval average width can fully reflect the advantages and disadvantages of the uncertainty forecast result of wind power, so as to obtain a more accurate evaluation result.

S5.2: An optimal wind power forecast result is determined according to the evaluation result.

S5.3: The optimal wind power forecast result is used as reference data for power dispatching to participate in a power dispatching work to assist power dispatchers in formulating a power dispatching scheme, thereby achieving the balance of power supply and demand, and ensuring the stable operation of a power system.

In order to illustrate the technical solution of the present disclosure, an example is given below:

First, wind power data is acquired, and the wind power data from 2014 to 2015 in the MIDATL region on the US PJM website is used. An experimental platform uses an open-source Python distribution version Anaconda for programming, the simulation uses a compute unified device architecture (CUDA) of the NVIDIA Corporation of the United States to make full use of memory resources of a graphics processing unit (GPU), and at the same time, a GPU acceleration library cuDNN for neural networks is applied to make the CUDA more suitable for the use of deep neural networks, thereby greatly reducing the time required for simulation. The experimental platform uses a Google's deep learning framework TensorFlow. Computer conditions are CPU: Core i7-7700, memory: 16G, GPU: 1070 8G.

Figure 6:
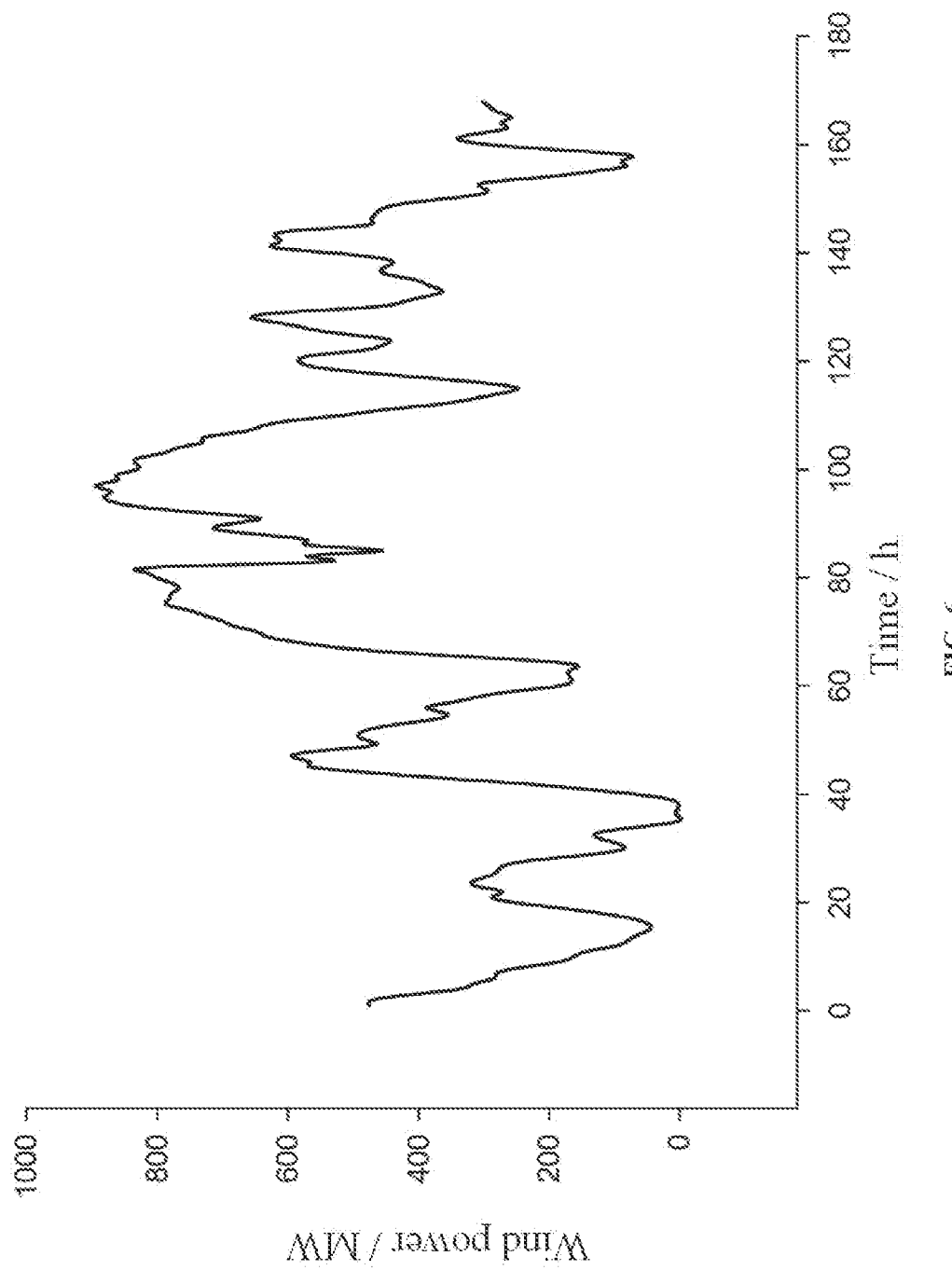
FIG. 6 is a curve diagram of wind power in the MIDATL region of the United States provided in Embodiment 1 of the present disclosure.

The wind power in the MIDATL region from Jan. 7, 2014 to Jan. 13, 2014 is shown in FIG. 6. It can be seen that the fluctuation of the wind power time series is very large, and the wind power always has a local maximum point or minimum point with a peak value. This is caused by factors such as sudden changes in meteorological factors during extreme weather. It can be intuitively seen that the fluctuation and randomness of the wind power are very obvious. However, on the whole, the fluctuation process will present a certain regularity. According to the process shown in FIG. 1, first, the missing data which has a greater influence on the forecast accuracy is processed by a Lagrangian interpolation method to improve the continuity of the data, thereby improving the forecast accuracy of a model. Then, the original wind power data is normalized by a maximum and minimum normalization method, so as to be converted into data between [0, 1]. After being preprocessed, the data is input into the time-variant deep feed-forward neural network forecast model for training and forecasting. In combination with the alternate output between different hidden layers and multi-step forecast, each time of multi-step forecast can obtain the wind power in the next 12 hours. Subsequently, a rolling forecast is performed to add the latest data to forecast the value in the next 1 hour. The rolling forecast is performed 500 times, and wind power forecast results in the next 500 hours are obtained. The rolling forecast refers to the forecast of the wind power forecast result in the next period of time by adding the latest data. For a stable forecast model, it is not necessary to fit every time of forecast, and a preset threshold can be set. For example, fitting is performed every 1 hour, and during this period, the rolling forecast is achieved only by adding the latest data.

Figure 7:
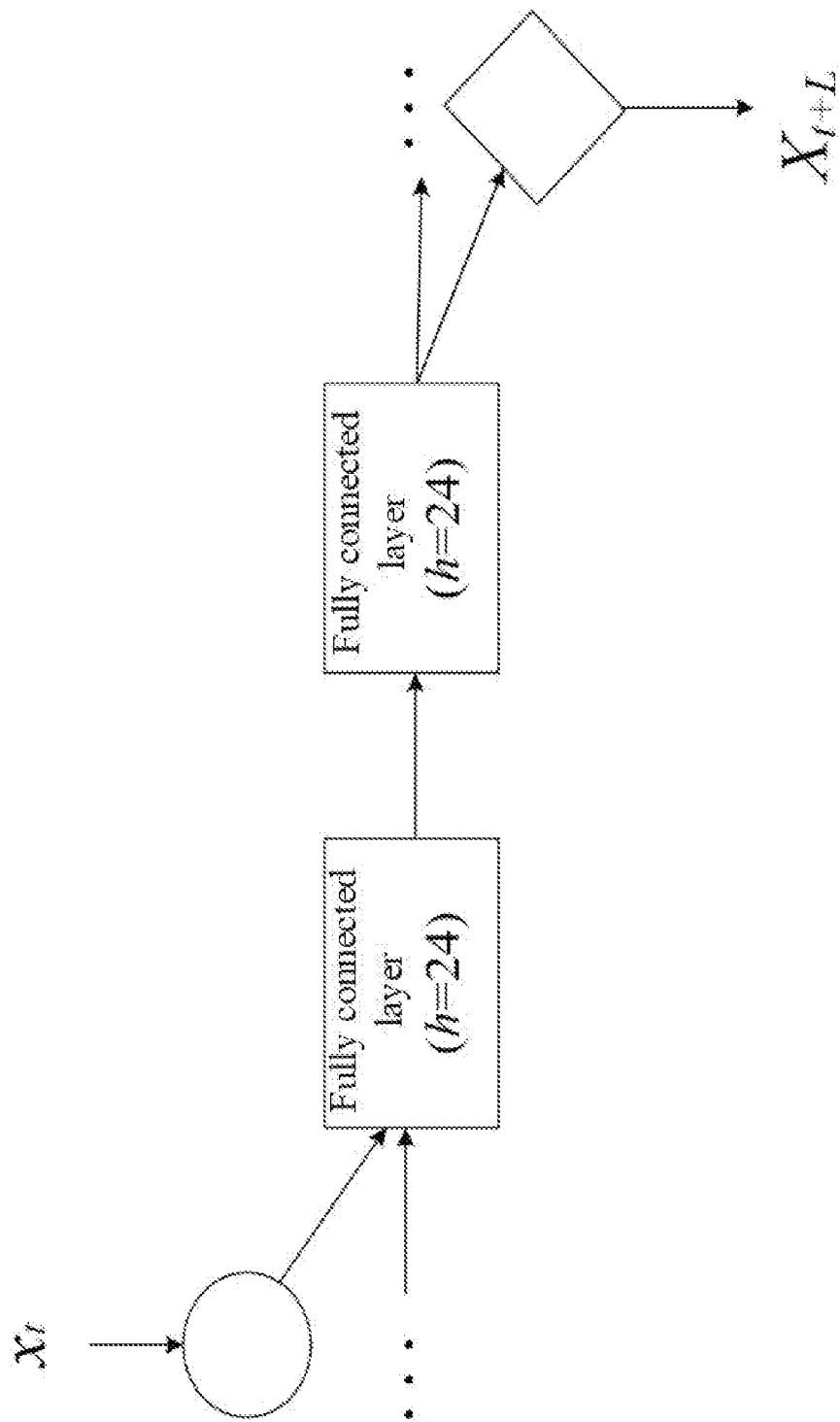
FIG. 7 is a structural diagram of a fully connected network (FCN) hidden layer provided in Embodiment 1 of the present disclosure.
Figure 8:
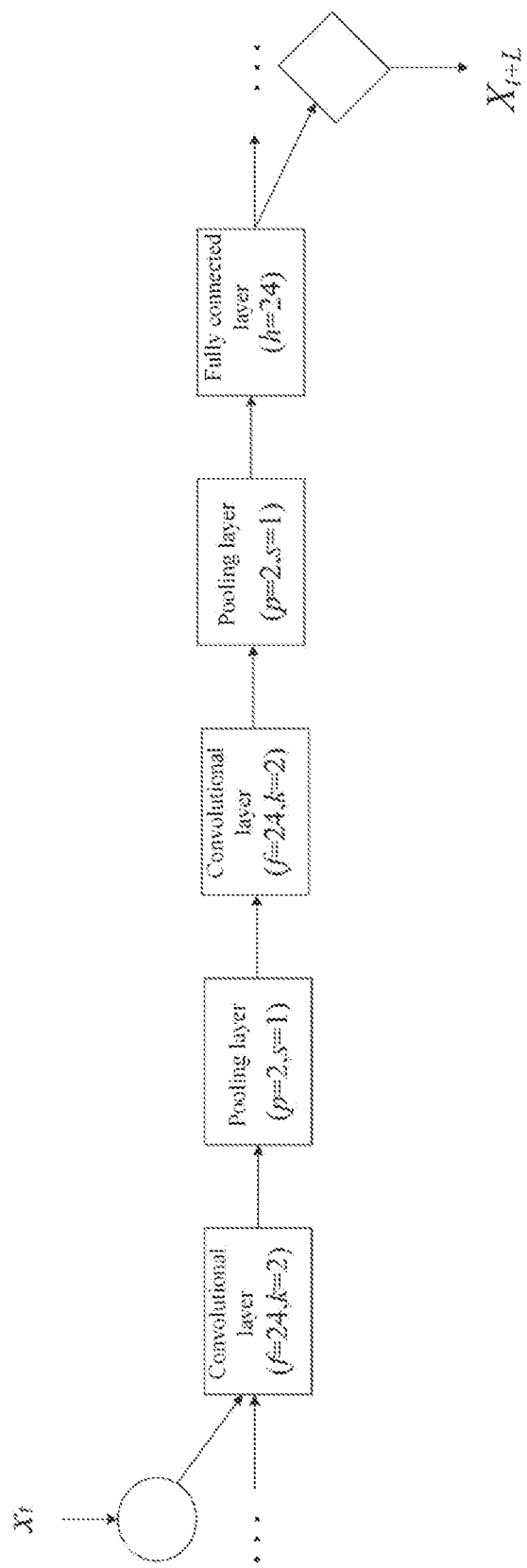
FIG. 8 is a structural diagram of a convolutional neural network (CNN) hidden layer provided in Embodiment 1 of the present disclosure.
Figure 9:
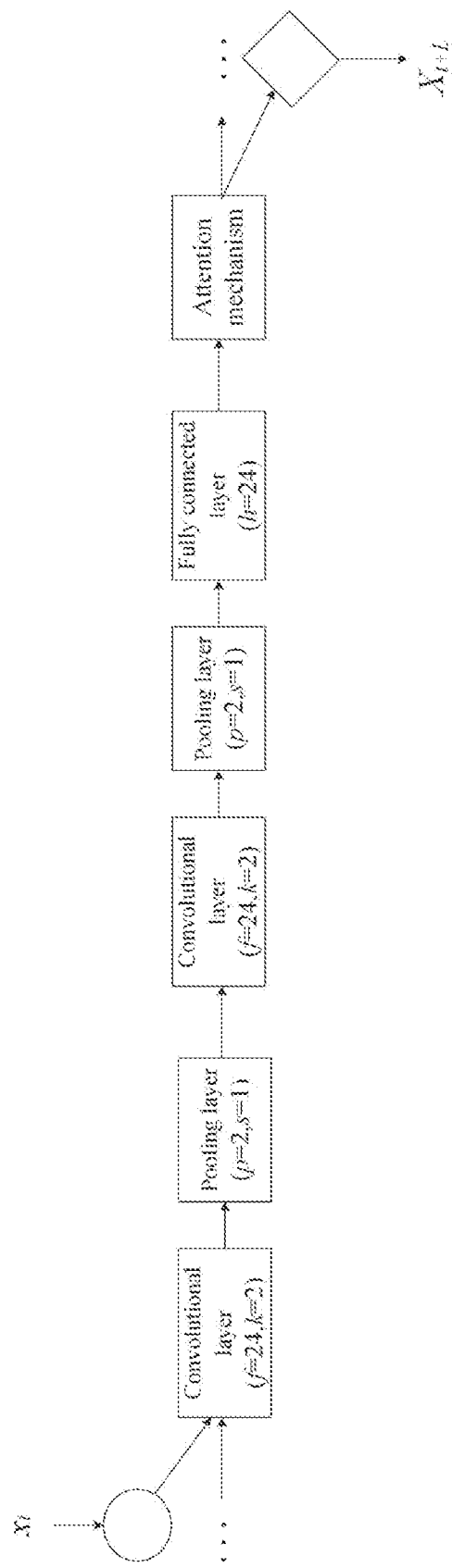
FIG. 9 is a structural diagram of a CNN hidden layer with an attention mechanism provided in Embodiment 1 of the present disclosure.

FIG. 7 is a structural diagram of an FCN hidden layer, where h represents a number of hidden neurons in each layer. Each hidden layer includes two fully connected layers, and each fully connected layer has 24 ReLU neurons. FIG. 8 is a structural diagram of a CNN hidden layer, where f represents a number of convolution kernels, k represents a size of each convolution kernel, p and s respectively represent the padding and stride of a pooling layer, and h represents a number of hidden neurons. Each hidden layer unit of this model sequentially includes a convolutional layer with 24 convolution kernels (the size of each convolution kernel is 2), an average pooling layer with a pool size of 2 and a stride of 1, a repeated convolutional layer, a repeated pooling layer, and a fully connected layer consisting of 24 ReLU neurons. FIG. 9 is a structural diagram of a CANN hidden layer, where an attention mechanism is added on the basis of the CNN hidden layer.

Figure 10A:
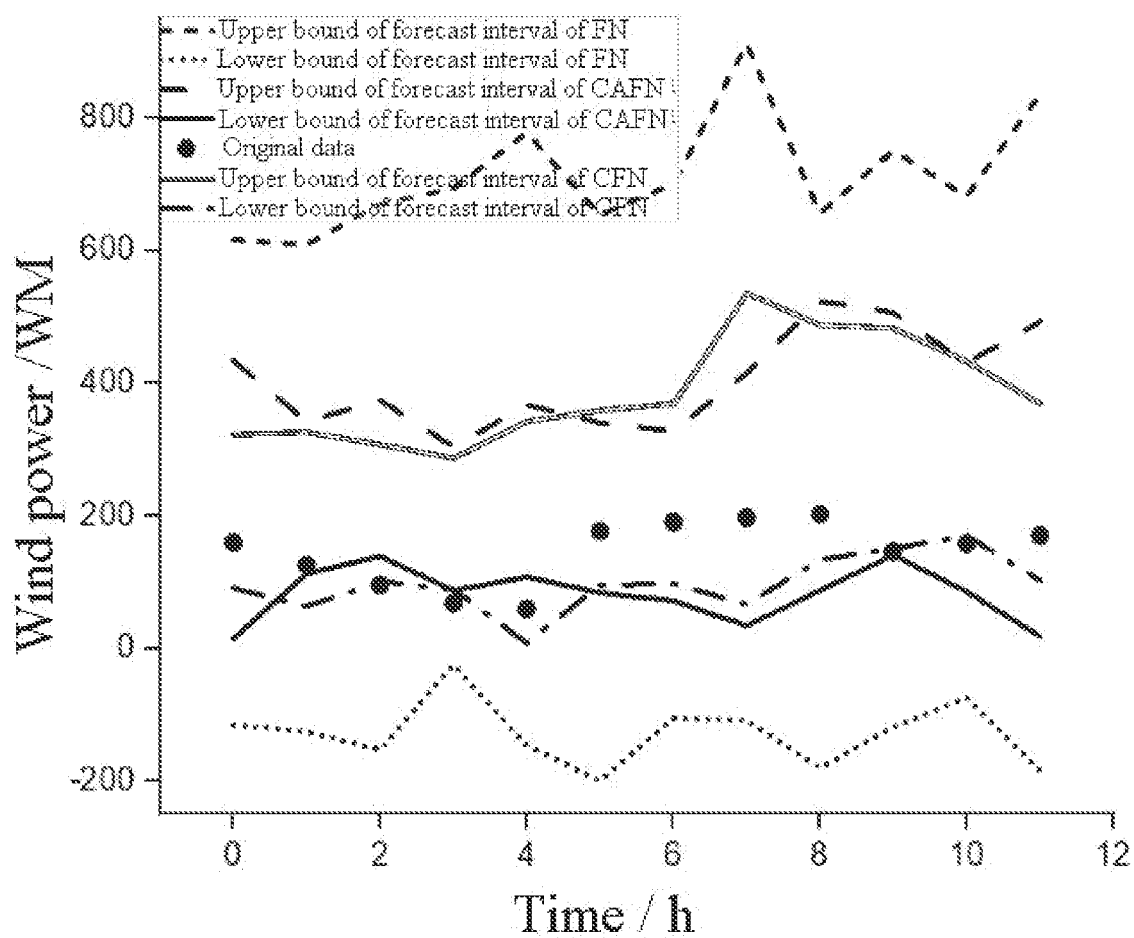
FIGS. 10a-10c show schematic diagrams of forecast interval ranges under different confidence levels of models corresponding to different hidden layers provided in Embodiment 1 of the present disclosure.
Figure 10B:
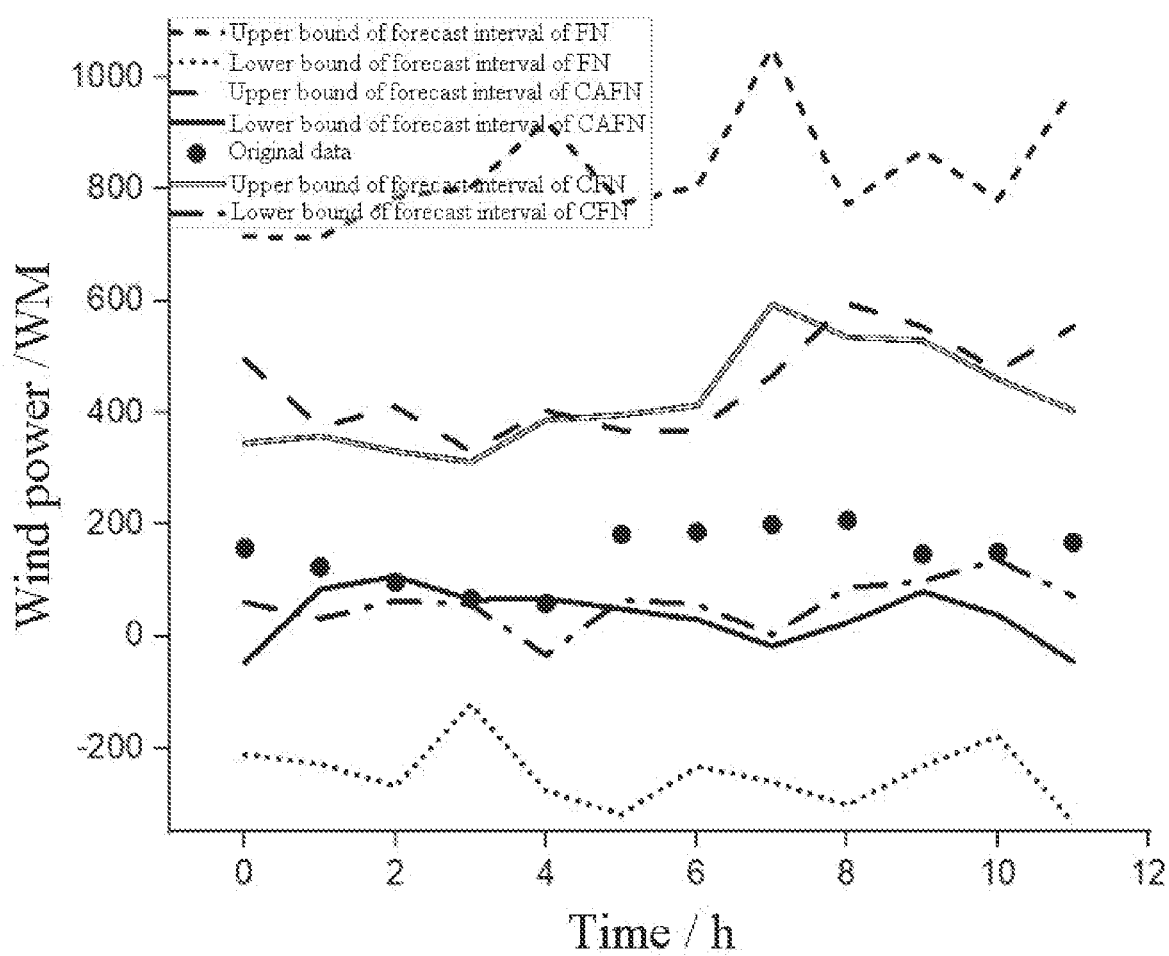
Figure 10C:
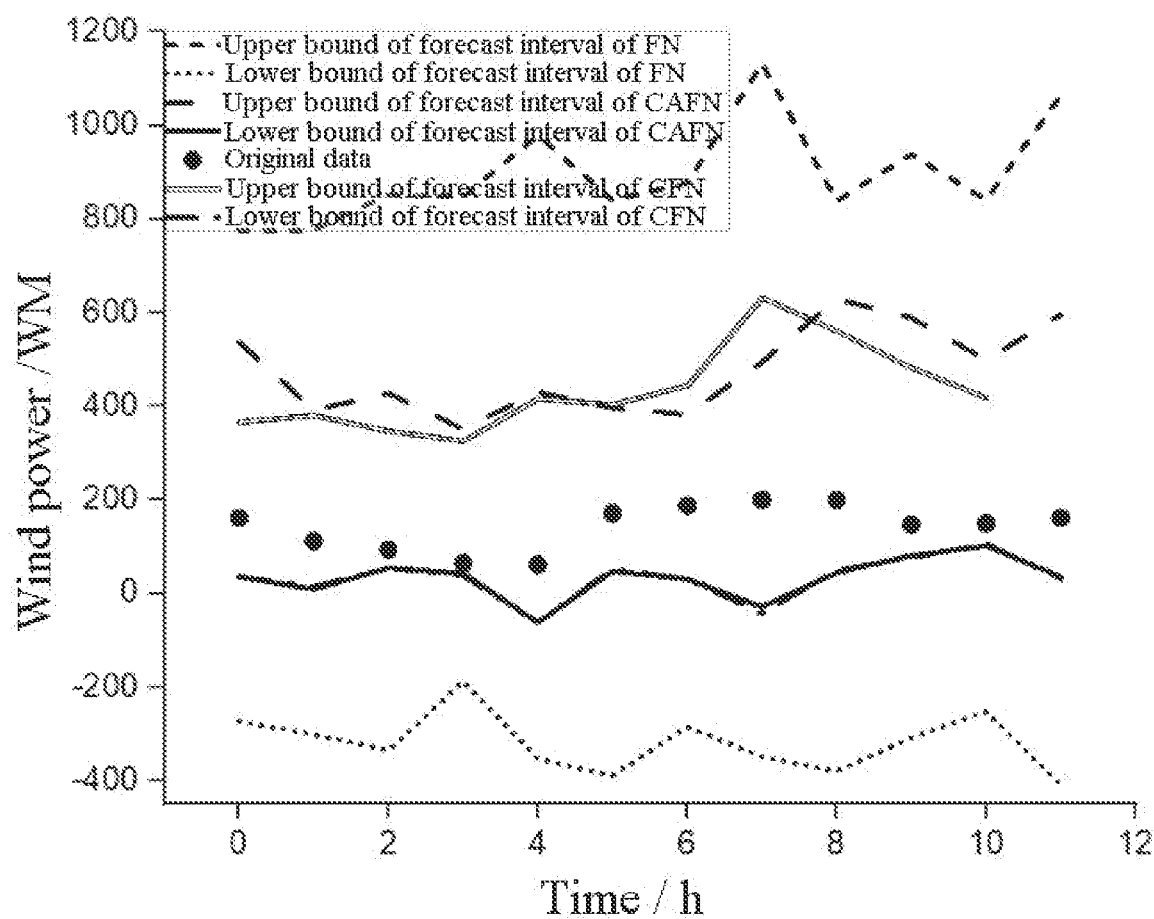
Figure 11A:
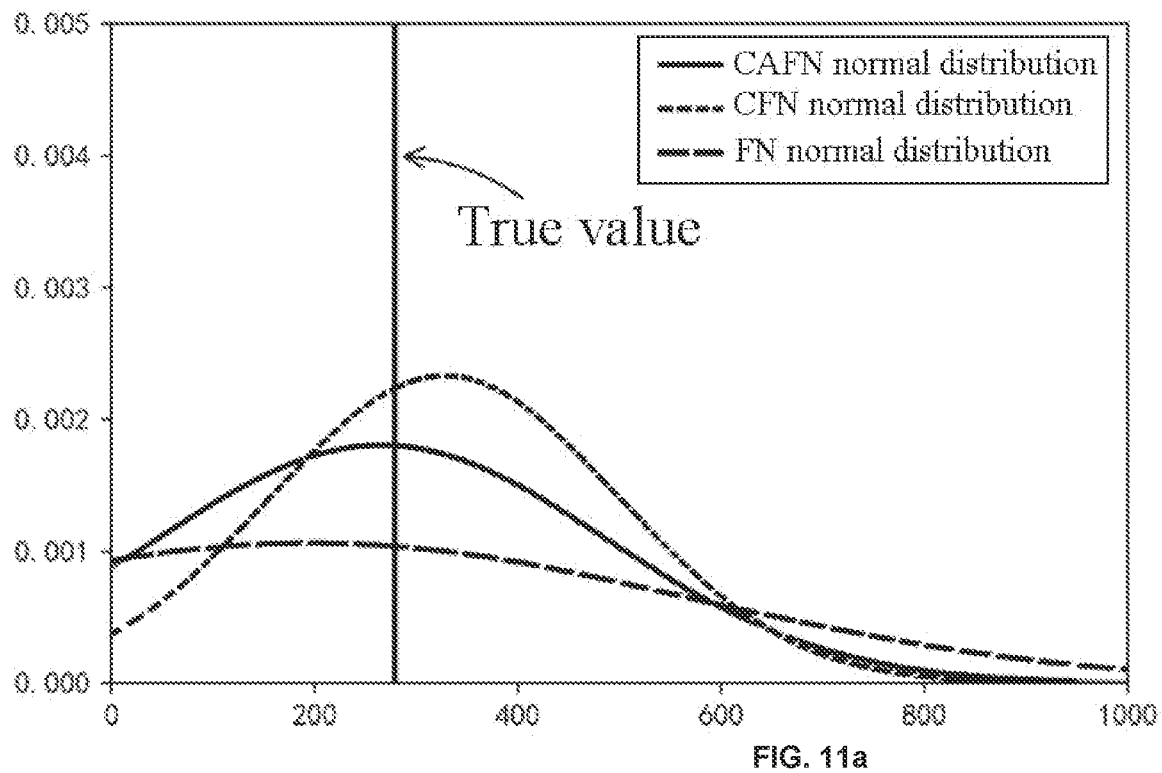
FIGS. 11a-11i show normal distribution diagrams of the models corresponding to an FCN hidden layer, a CNN hidden layer and a CNN hidden layer with an attention mechanism provided in Embodiment 1 of the present disclosure at 9 different time points.
Figure 11B:
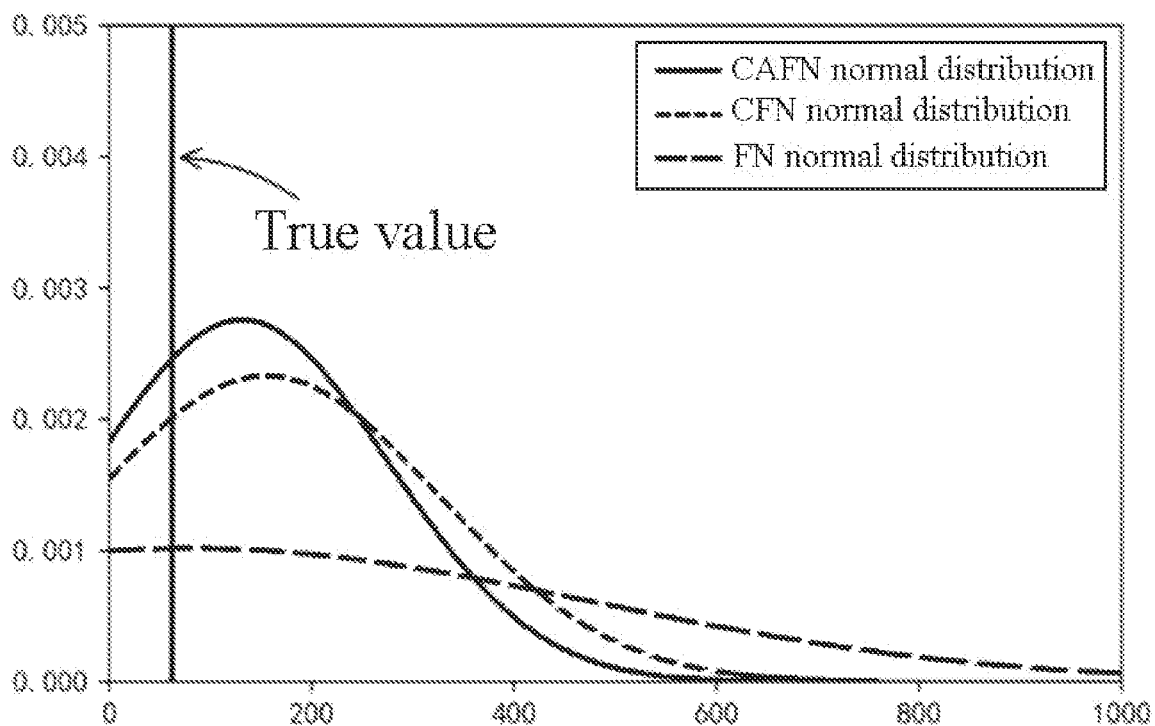
Figure 11C:
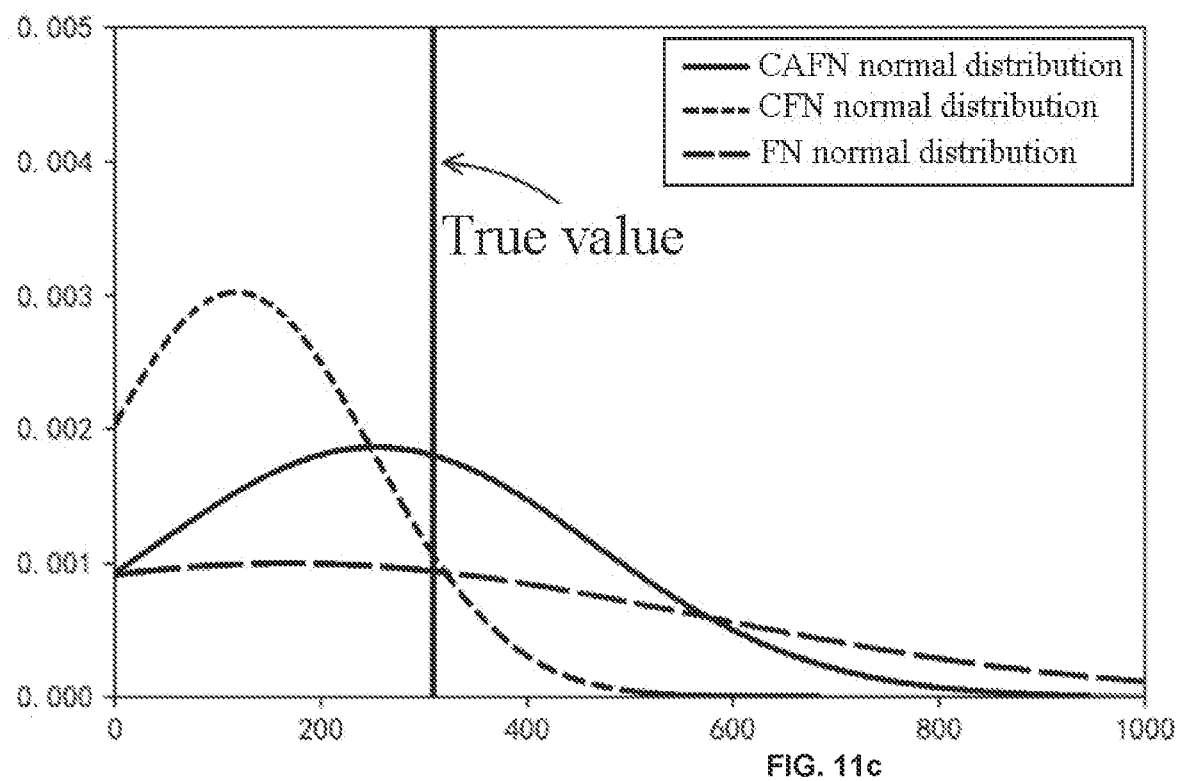
Figure 11D:
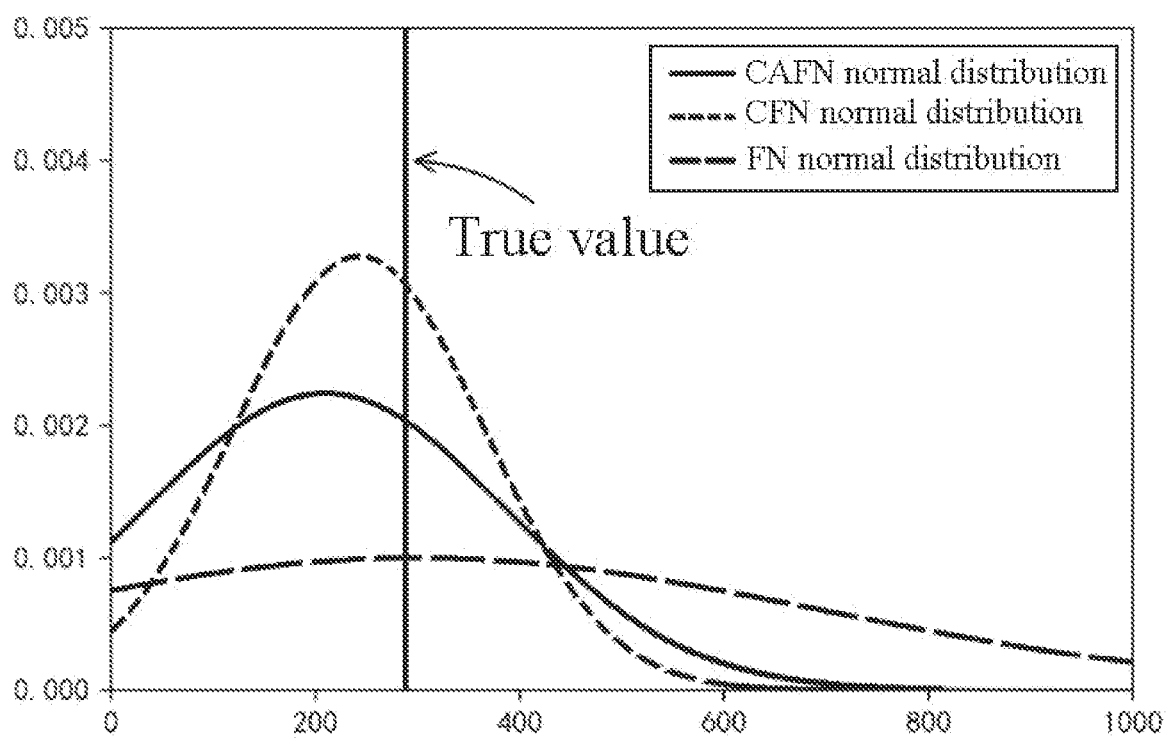
Figure 11E:
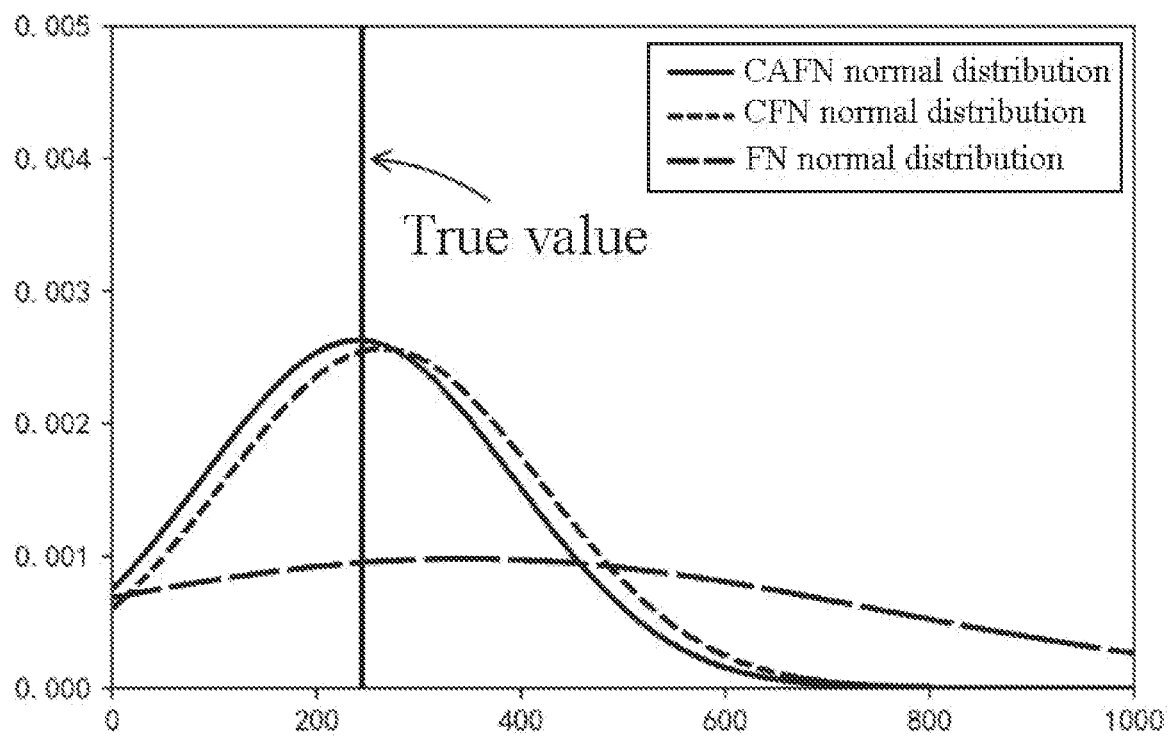
Figure 11F:
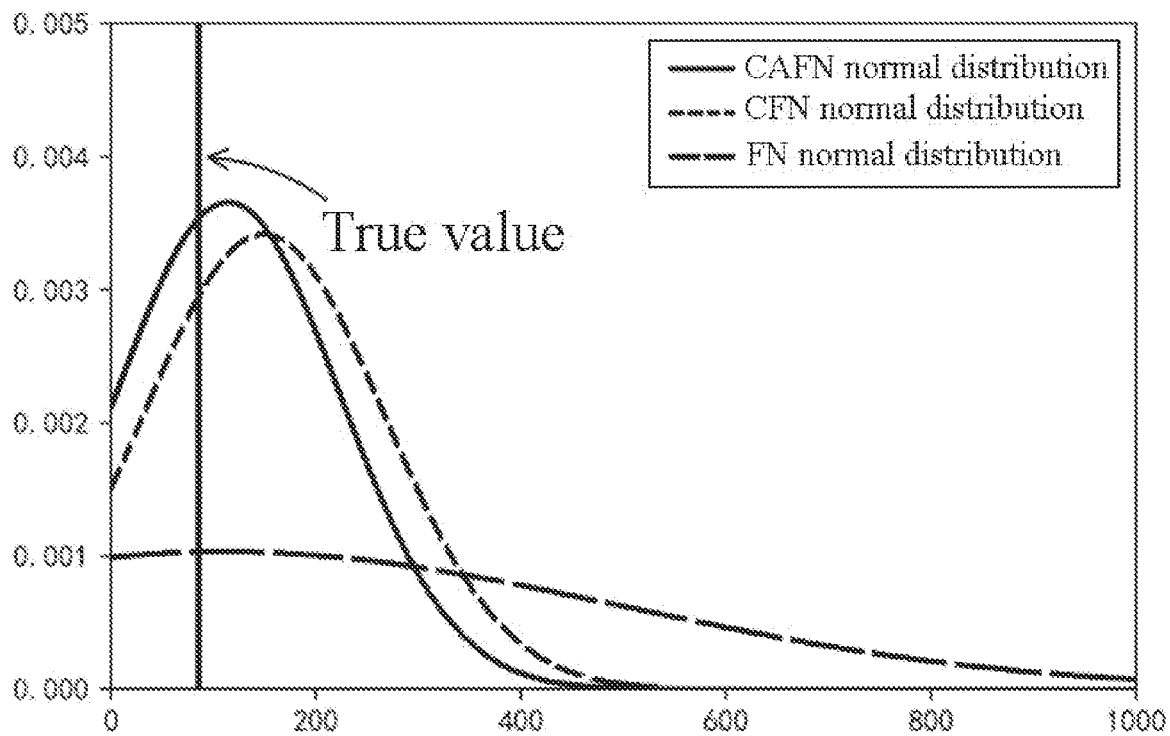
Figure 11G:
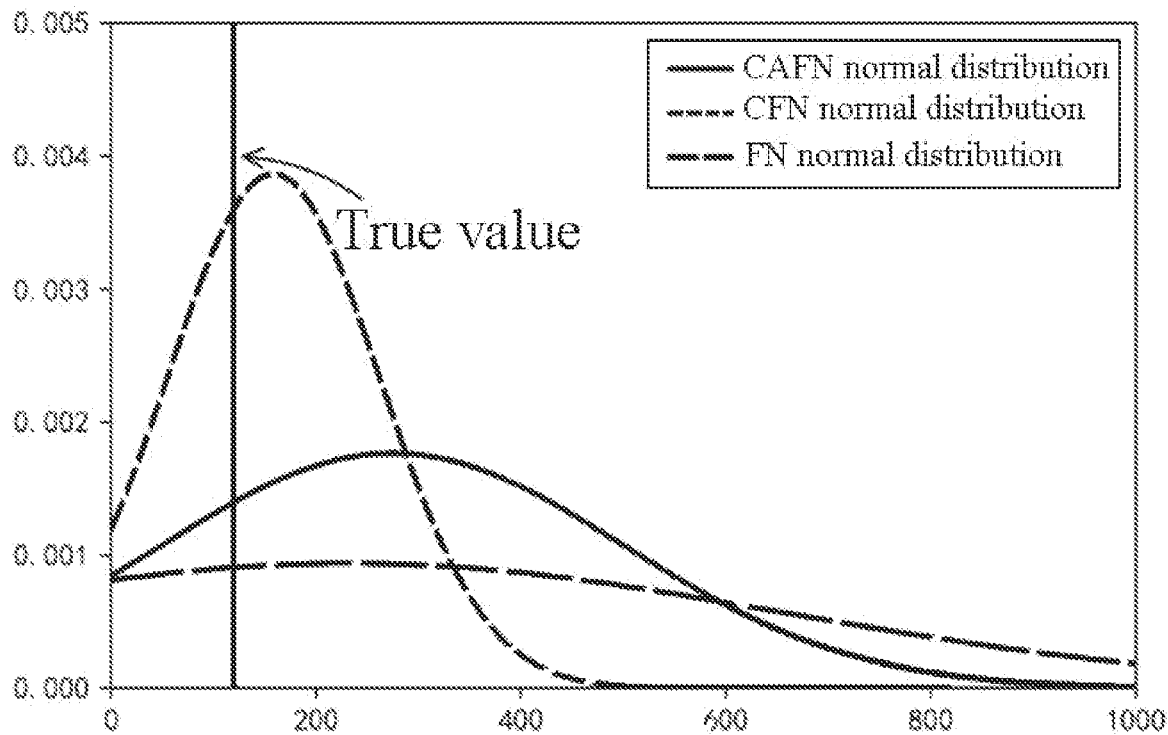
Figure 11H:
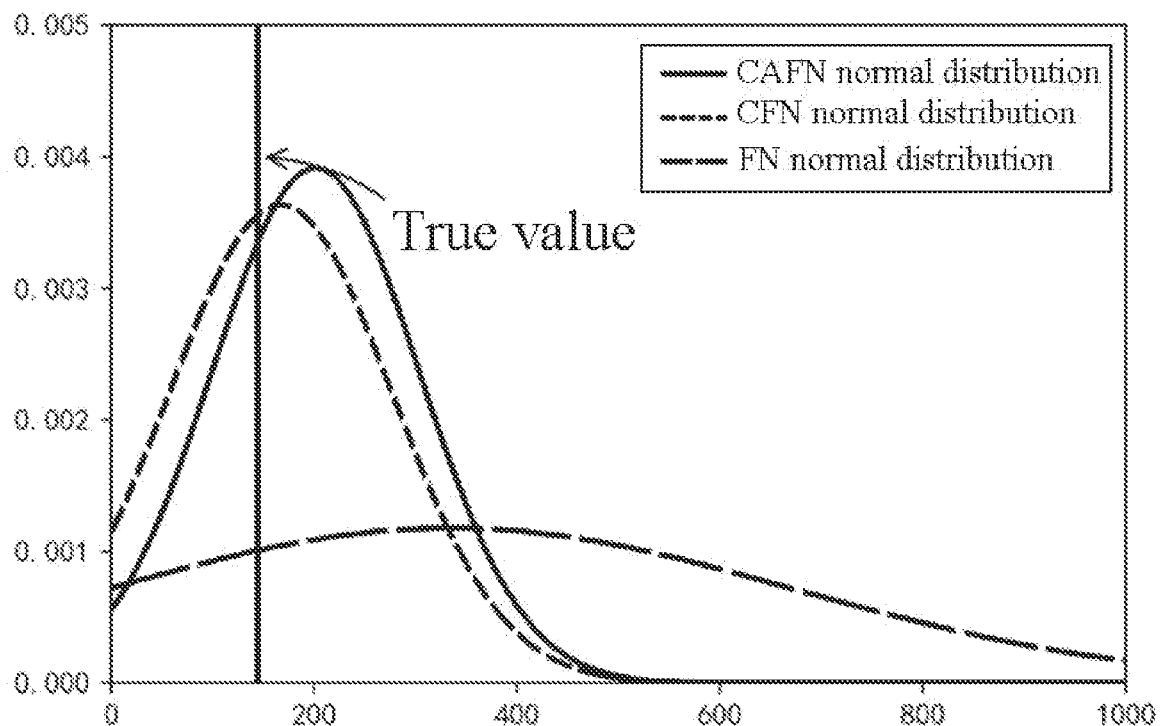
Figure 11I:
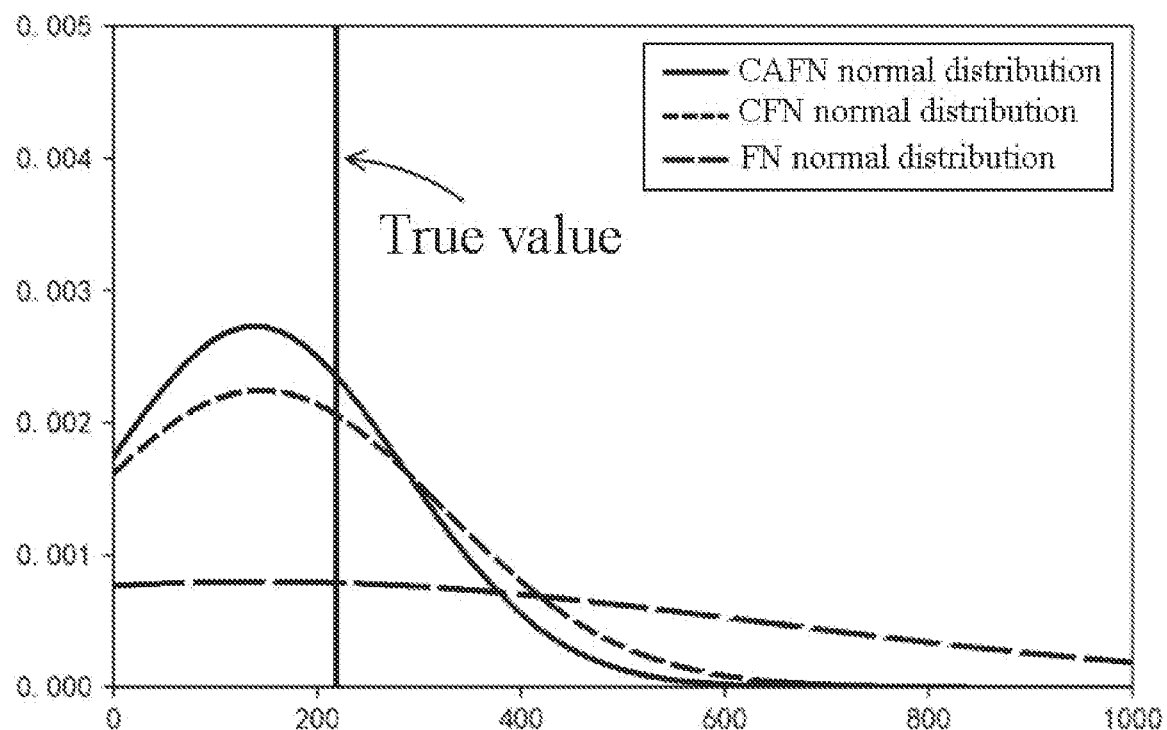

FIG. 10(*a*) is a schematic diagram of forecast interval ranges of the time-variant deep feed-forward neural network forecast models corresponding to three different hidden layers under a 80% confidence level, FIG. 10(*b*) is a schematic diagram of forecast interval ranges under a 85% confidence level, and FIG. 10(*c*) is a schematic diagram of forecast interval ranges under a 90% confidence level. FN refers to ForecastNet of which the hidden layer is the FCN, CFN refers to ForecastNet of which the hidden layer is the CNN, and CAFN refers to ForecastNet of which the hidden layer is the CNN with the attention mechanism. It can be clearly seen from the figures that most of the true values fall within the forecast interval ranges of the time-variant deep feed-forward neural network forecast models corresponding to three different hidden layers. With the increase of the pre-given confidence level, the forecast interval range given by the model also increases. The change trend of the forecast intervals given by the time-variant deep feed-forward neural network forecast models corresponding to three different hidden layers is substantially the same as the fluctuation of wind power. The model corresponding to the CANN hidden layer has the best performance in tracking the change trend of wind power, and more true values of wind power fall within the forecast interval under a high confidence level. Comparing the forecast interval ranges given by the time-variant deep feed-forward neural network forecast models corresponding to three different hidden layers, it can be clearly seen that the forecast interval width obtained by the models corresponding to the CANN hidden layer and the CNN hidden layer is much smaller than the forecast interval width obtained by the model corresponding to the FCN hidden layer. FIG. 11(*a*) to FIG. 11(*i*) are normal distribution diagrams of 9 time points randomly selected from 500 forecast times in the future respectively, where a horizontal axis represents wind power (unit: MW), a longitudinal axis represents a probability value, and a solid line perpendicular to the horizontal axis represents a true value. It can be seen from the figures that the true values of wind power fall within a middle region of three curves, indicating that the time-variant deep feed-forward neural network forecast models respectively corresponding to the FCN hidden layer, the CNN hidden layer and the CANN hidden layer can better forecast the probability density distribution of wind power in the future time; and the true values fall near peaks of the three curves, indicating that a high probability interval given by a forecast curve is consistent with a true value of wind power, so as to illustrate the effectiveness and practicability of the method of the present disclosure.

Embodiment 2

Figure 12:
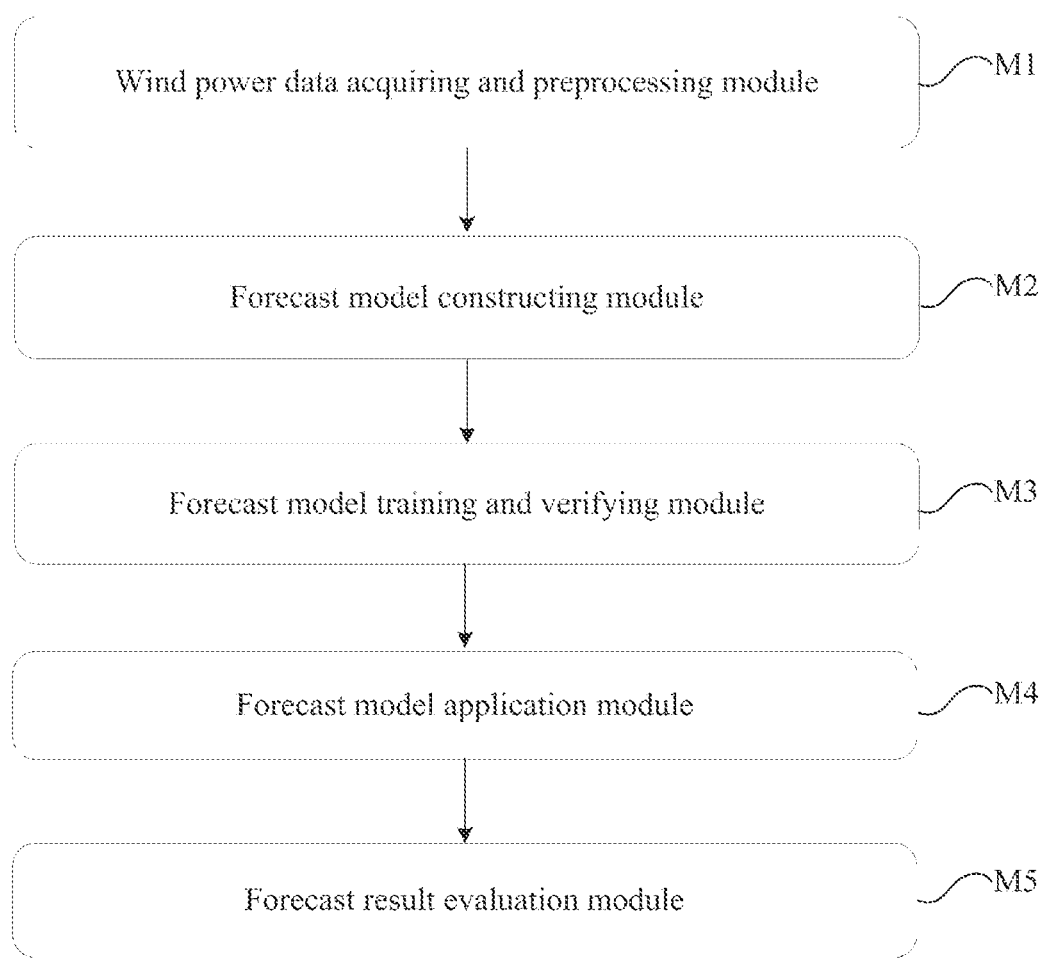
FIG. 12 is a structural block diagram of a forecast system of wind power probability density provided in Embodiment 2 of the present disclosure.

As shown in FIG. 12, this embodiment provides a forecast system of wind power probability density. Each functional module of the system is the same as and corresponds to each step of the method in Embodiment 1 one by one. The system specifically includes:

a wind power data acquiring and preprocessing module M1, used to acquire wind power data, preprocess the wind power data, and establish a data set;

a forecast model constructing module M2, used to construct a time-variant deep feed-forward neural network forecast model, where the time-variant deep feed-forward neural network forecast model includes multiple layers of neural networks, and each layer of neural network includes an input layer, a hidden layer and an output layer which are connected in sequence;

a forecast model training and testing module M3, used to divide the data set into a training set and a test set, where two input layers of two adjacent layers of neural networks take the wind power data at adjacent moments as an input, two output layers of two adjacent layers of neural networks take the probability density distribution of wind power at adjacent moments as an output, and the time-variant deep feed-forward neural network forecast model is trained and tested to obtain a trained time-variant deep feed-forward neural network forecast model;

a forecast model application module M4, used to input the wind power data to be forecasted into the trained time-variant deep feed-forward neural network forecast model for forecasting to obtain a wind power forecast result, where the wind power forecast result is used as reference data for power dispatching; and a forecast result evaluation module M5, used to evaluate an uncertainty error of the wind power forecast result by double indexes of an interval coverage rate and an interval average width together, determine an optimal wind power forecast result according to an evaluation result, and take the optimal wind power forecast result as reference data for power dispatching to participate in a power dispatching work.

The present disclosure provides a forecast method and system of wind power probability density. By using the time-varying property and the multi-step forecast ability of the time-variant deep feed-forward neural network forecast model, the forecast accuracy can be effectively improved, accurate probability density distribution of wind power in a period of time in the future can be forecasted, an accurate wind power fluctuation range can be provided for a power system when formulating unit combinations and robust dispatching plans, the support value of wind power forecast in dispatching strategy optimization is improved, and the practical level of power forecast is improved.

The above is an illustration of the present disclosure, and should not be construed as a limitation of the present disclosure. Although several exemplary embodiments of the present disclosure are described, those skilled in the art can easily understand that many modifications may be made to the exemplary embodiments without departing from the novel teachings and advantages of the present disclosure. Accordingly, all these modifications are intended to be included within the scope of the present disclosure as defined in the claims. It should be understood that the above is an illustration of the present disclosure and should not be construed as limited to the particular embodiments disclosed, and modifications of the disclosed embodiments and other embodiments are intended to be included within the scope of the appended claims. The present disclosure is defined by the claims and their equivalents.

What is claimed is:

1. A forecast method of wind power probability density, comprising:

acquiring wind power data, preprocessing the wind power data, and establishing a data set;

constructing a time-variant deep feed-forward neural network forecast model, wherein the time-variant deep feed-forward neural network forecast model comprises multiple layers of neural networks, and each layer of neural network comprises an input layer, a hidden layer and an output layer which are connected in sequence;

dividing the data set into a training set and a test set; taking wind power data at adjacent moments as an input of two input layers of two adjacent layers of neural networks, taking probability density distribution of wind power at adjacent moments as an output of two output layers of two adjacent layers of neural networks, and training and testing the time-variant deep feed-forward neural network forecast model to obtain a trained time-variant deep feed-forward neural network forecast model;

inputting the wind power data to be forecasted into the trained time-variant deep feed-forward neural network forecast model for forecasting to obtain a wind power forecast result, wherein the wind power forecast result is used as reference data for power dispatching;

evaluating an uncertainty error of the wind power forecast result by double indexes of an interval coverage rate and an interval average width together;

determining an optimal wind power forecast result according to an evaluation result; and based on the optimal wind power forecast result, providing a wind power fluctuation range to a power system for formulating unit combinations and power dispatching plans.

2. The forecast method according to claim 1, wherein the hidden layer adopts a fully connected network (FCN), a convolutional neural network (CNN) or a CNN with an attention mechanism (CANN).

3. The forecast method according to claim 1, wherein the step of acquiring wind power data, preprocessing the wind power data, and establishing a data set specifically comprises:

acquiring original wind power data;

supplementing missing data in the original wind power data by a Lagrangian interpolation method;

normalizing the wind power data after supplementing by a maximum and minimum normalization method, and converting each piece of the wind power data into wind power data between [0, 1]; and establishing the data set by the converted wind power data.

4. The forecast method according to claim 1, wherein the step of constructing a time-variant deep feed-forward neural network forecast model specifically comprises:

constructing a time-variant deep feed-forward neural network forecast model with L layers of neural networks, wherein the output of the time-variant deep feed-forward neural network forecast model is expressed as:

$$y_t' = f_t(g_t(x_t', h_{t-1}', y_{t-1}')) = f_t(g_t(x_{t-t_0}, h_{t-t_0-1}, y_{t-t_0-1})),$$

wherein $x_t$ and $x_t'$ represent input wind power data at two adjacent moments, $h_t$ and $h_t'$ represent two hidden layers, $y_t$ and $y_t'$ represent two outputs corresponding to $x_t$ and $x_t'$ respectively, to represents a time variation, $x_t' = x_{t-t_0}$, and $h_t' = h_{t-t_0}$;

establishing a probability distribution model on each of the output layers, wherein the probability distribution model adopts a normal distribution model, and an average value $\mu^{[l]}$ and a standard deviation $\sigma^{[l]}$ of normal distribution output by a hidden layer of an lth layer of neural network are respectively expressed as:

$$\mu^{[l]} = W_\mu^{[l]T} \alpha^{[l-1]} + b_\mu^{[l]},$$

$$\sigma^{[l]} = \log(1 + \exp(W_\sigma^{[l]T} \alpha^{[l-1]} + b_\sigma^{[l]})),$$

wherein l represents the lth layer of neural network of the time-variant deep feed-forward neural network forecast model, $\alpha^{[l-1]}$ represents an output of a previous hidden layer, $W_\mu^{[l]T}$ and $b_\mu^{[l]}$ respectively represent a weight and a bias of the average value, and $W_\sigma^{[l]T}$ and $b_\sigma^{[l]}$ respectively represent a weight and a bias of the standard deviation;

in a forecast process, sampling the normal distribution $\mathcal{N}(\mu^{[l]}, \sigma^{[l]})$ to obtain a forecast result of the lth layer of neural network, and feeding the forecast result obtained after sampling back to the next layer of network; taking a maximum likelihood estimation as a loss function, and performing back propagation to obtain a weight and a bias of the network; and training the network by an Adam gradient descent method to optimize a log likelihood function of normal distribution, wherein a loss function C of the time-variant deep feed-forward neural network forecast model is expressed as:

$$C = \log \prod_{i=1}^{l} p(x_i; N(\mu, \sigma)),$$

wherein $x_i$ represents a wind power data sample, $p(x_i; \mathcal{N}(\mu, \sigma))$ represents distribution density of the wind power data sample, and $$\prod_{i=1}^{l} p(x_i; N(\mu, \sigma))$$

represents a likelihood function of the wind power data sample.

5. The forecast method according to claim 4, wherein for the lth layer of neural network of the time-variant deep feed-forward neural network forecast model, a chain method is used to calculate a partial derivative of the loss function with respect to a weight matrix of the lth layer of neural network, expressed as:

$$\frac{\partial C}{\partial W^{[l]}} = \frac{\partial C}{\partial a^{[l]}} \frac{\partial a^{[l]}}{\partial W^{[l]}},$$

wherein l represents the lth layer of neural network of the time-variant deep feed-forward neural network forecast model, $W^{[l]}$ represents the weight matrix, C represents the loss function, $\alpha^{[l]}$ represents an output vector, an input vector is $z^{[l]} = W^{[l]T} \alpha^{[l-1]} + \bar{b}^{[l]}$, and $\bar{b}^{[l]}$ represents a bias parameter matrix;

a calculation process of the alternate output of hidden layers is expressed as:

$$\frac{\partial C}{\partial W^{[l]}} = \sum_{k=0}^{\frac{L-1-l}{2}} \frac{\partial C}{\partial z^{[l+2k+1]}} \frac{\partial z^{[l+2k+1]}}{\partial a^{[l+2k]}} \Psi_k \frac{\partial a^{[l]}}{\partial W^{[l]}},$$

wherein L represents a number of layers of neural networks of the time-variant deep feed-forward neural network forecast model, k represents a number of consecutive multipliers, and $\Psi_k$ represents a product of chain method derivatives, expressed as:

$$\Psi_k = \begin{cases} 1 & k = 0 \\ \prod_{j=1}^{k} \frac{\partial z^{[l+2j]}}{\partial a^{[l+2(j-1)]}} & k > 0 \end{cases},$$

wherein j represents a single element of a cumulative term; and in the calculation process of the alternate output of the hidden layers, the gradient calculation of each of the hidden layers refers to a sum of items after a multiplication chain in the chain method is decomposed into multiple items, and the calculation process continues until the last output layer.

6. The forecast method according to claim 1, wherein in a training process of the time-variant deep feed-forward neural network forecast model, $x_{t-L+1}, x_{t-L}, \ldots, x_{t-1}$ and $x_t$ are input, and corresponding outputs are $X_{t+1}, X_{t+2}, \ldots, X_{t+L-1}$ and $X_{t+L}$, wherein L represents a number of layers of neural networks of the time-variant deep feed-forward neural network forecast model, t represents a time variable, $x_{t-L+1}, x_{t-L}, x_{t-1}$ and $x_t$ respectively represent wind power data corresponding to a time t−L+1, a time t−L, a time t−1 and a time t, and $X_{t+1}, X_{t+2}, X_{t+L-1}$ and $X_{t+L}$ respectively represent probability density distribution of wind power corresponding to a time t+1, a time t+2, a time t+L−1 and a time t+L.

7. The forecast method according to claim 1, wherein the step of evaluating an uncertainty error of the wind power forecast result by double indexes of an interval coverage rate and an interval average width together specifically comprises:

evaluating the uncertainty error of the wind power forecast result by the interval coverage rate, expressed as:

$$\begin{cases} I_i^\alpha = [L_i^\alpha, U_i^\alpha] \\ \xi_i^\alpha = \begin{cases} 0 & P^i \notin I_i^\alpha \\ 1 & P^i \in I_i^\alpha \end{cases} \quad i = 1, 2, ggg, N \\ R_{cover} = \frac{1}{N}\sum_{i=1}^{N}\xi_i^\alpha \end{cases},$$

wherein $L_i^\alpha$ represents a lower bound of an ith forecast interval under a confidence level 1−α; $U_i^\alpha$ represents an upper bound of the ith forecast interval under the confidence level 1−α; $I_i^\alpha$ represents the ith forecast interval; N represents a number of forecast intervals; $P^i$ represents a value corresponding to an actual point; $R_{cover}$ represents a reliability index; $\xi_i^\alpha$ represents a coverage rate of a wind power forecast interval to a true value; and evaluating the uncertainty error of the wind power forecast result by the interval average width, expressed as:

$$\begin{cases} \delta_i^\alpha = U_i^\alpha - L_i^\alpha \\ NWP = \frac{1}{N}\sum_{i=1}^{N}\delta_i^\alpha \end{cases},$$

wherein $\delta_i^\alpha$ represents a width of the ith forecast interval, and NWP represents an interval average width index.

* * * * *